(12) United States Patent　　　　(10) Patent No.: US 12,583,395 B2

Williams　　　　　　　　　　　　　(45) Date of Patent: Mar. 24, 2026

(54) RAIL TOP CARGO MANAGEMENT SYSTEM

(71) Applicant: Marty Williams, Colorado Springs, CO (US)

(72) Inventor: Marty Williams, Colorado Springs, CO (US)

(73) Assignee: Let's Go Aero

( * ) Notice: Subject to any disclaimer, the term of this patent is extended or adjusted under 35 U.S.C. 154(b) by 0 days.

(21) Appl. No.: 16/049,486

(22) Filed: Jul. 30, 2018

(65) Prior Publication Data

US 2020/0031289 A1　　Jan. 30, 2020

(51) Int. Cl.
B60R 9/06　　　　(2006.01)
B60R 9/10　　　　(2006.01)

(52) U.S. Cl.
CPC . B60R 9/06 (2013.01); B60R 9/10 (2013.01)

(58) Field of Classification Search
CPC ................................... B60R 9/06; B60R 9/10
USPC ......................................................... 224/403
See application file for complete search history.

(56) References Cited

U.S. PATENT DOCUMENTS

| | | | | |
|---|---|---|---|---|
| 640,736 | A | * | 1/1900 | Biester ..................... B60R 9/06 <br> 211/19 |
| 3,204,839 | A | * | 9/1965 | Yuda ......................... B60R 9/10 <br> 224/324 |
| 4,057,182 | A | * | 11/1977 | Kolkhorst ................. B60R 9/10 <br> 224/403 |

| | | | | |
|---|---|---|---|---|
| 4,425,729 | A | * | 1/1984 | Miyamae ............... A01K 97/10 <br> 248/538 |
| 4,444,427 | A | * | 4/1984 | Martin ...................... B60P 3/42 <br> 224/403 |
| 4,485,579 | A | * | 12/1984 | Hawie .................... A01K 97/10 <br> 248/512 |
| 4,815,787 | A | * | 3/1989 | Hale ......................... B60P 3/32 <br> 296/10 |
| 4,850,769 | A | * | 7/1989 | Matthews ............. B60P 7/0815 <br> 410/105 |
| 5,067,641 | A | * | 11/1991 | Johnson ................... B60R 9/06 <br> 224/501 |
| 5,092,504 | A | * | 3/1992 | Hannes ..................... B60R 9/00 <br> 211/17 |
| 5,096,102 | A | * | 3/1992 | Tolson ..................... B60R 9/06 <br> 224/501 |
| 5,139,375 | A | * | 8/1992 | Franchuk .................. B60P 7/04 <br> 224/321 |
| 5,165,750 | A | * | 11/1992 | Pirhonen .................. B60J 7/104 <br> 296/100.18 |
| 5,181,222 | A | * | 1/1993 | Duarte ................ H01S 3/08004 <br> 372/102 |
| 5,181,822 | A | * | 1/1993 | Allsop ..................... B60R 9/06 <br> 224/402 |
| 5,228,736 | A | * | 7/1993 | Dutton .................... B60J 7/104 <br> 296/100.16 |

(Continued)

*Primary Examiner* — Peter N Helvey

(74) *Attorney, Agent, or Firm* — Apex Juris, pllc; Cera Oh

(57) ABSTRACT

A cargo management system comprising having a first member and a second member, where the first member and the second member meet in a corner to form an L and are secured one to the other; at least one first securement apparatus to secure the first member to a first rail; at least one second securement apparatus to secure the second member to a second rail; at least one receiver on a top of the first member; and at least one cargo carrier securable to the receiver.

20 Claims, 24 Drawing Sheets

(56)                References Cited

U.S. PATENT DOCUMENTS

| | | | | |
|---|---|---|---|---|
| 5,261,719 A * | 11/1993 | Tucker | B60J 7/104 | 224/405 |
| 5,301,451 A * | 4/1994 | VanAssche | A01K 91/08 | 43/27.4 |
| 5,373,978 A * | 12/1994 | Buttchen | B60R 9/06 | 224/510 |
| 5,427,286 A * | 6/1995 | Hagerty | B60R 9/00 | 211/18 |
| 5,439,152 A * | 8/1995 | Campbell | B60R 9/00 | 211/195 |
| 5,497,927 A * | 3/1996 | Peterson | B60R 9/06 | 224/519 |
| 5,516,020 A * | 5/1996 | Lawler | B60R 9/00 | 224/570 |
| 5,522,635 A * | 6/1996 | Downey | B60J 7/102 | 160/368.1 |
| 5,533,848 A * | 7/1996 | Davis | B60P 7/0815 | 410/104 |
| 5,560,498 A * | 10/1996 | Porter | B62H 3/08 | 211/20 |
| 5,651,484 A * | 7/1997 | Fugman | B60R 9/0423 | 224/310 |
| 5,688,017 A * | 11/1997 | Bennett | B60J 7/08 | 296/100.17 |
| 5,813,164 A * | 9/1998 | Liberto | A01K 97/10 | 43/21.2 |
| 5,816,462 A * | 10/1998 | Brantley | B60R 9/00 | 224/558 |
| 5,820,004 A * | 10/1998 | Lane | B60R 9/06 | 224/485 |
| 5,934,735 A * | 8/1999 | Wheatley | B60J 7/102 | 296/100.01 |
| 5,950,892 A * | 9/1999 | Tsai | B60R 9/06 | 224/497 |
| 5,984,400 A * | 11/1999 | Miller | B60J 7/104 | 296/100.15 |
| 6,024,402 A * | 2/2000 | Wheatley | B60J 7/102 | 224/403 |
| 6,089,428 A * | 7/2000 | Wagner | B60R 9/10 | 224/401 |
| 6,149,039 A * | 11/2000 | Englander | B60R 9/042 | 224/310 |
| 6,186,571 B1 * | 2/2001 | Burke | B60R 9/00 | 296/3 |
| 6,196,602 B1 * | 3/2001 | Esplin | B60P 7/08 | 224/405 |
| 6,238,153 B1 * | 5/2001 | Karrer | B60P 7/0815 | 296/36 |
| 6,270,301 B1 * | 8/2001 | Dunlop | B60P 7/0815 | 410/102 |
| 6,431,423 B1 * | 8/2002 | Allen | B60R 9/048 | 224/324 |
| 6,491,195 B1 * | 12/2002 | McLemore | B60R 9/06 | 224/521 |
| 6,511,272 B2 * | 1/2003 | Stafford | B60P 7/15 | 410/121 |
| 6,547,311 B1 * | 4/2003 | Derecktor | B60P 7/0815 | 248/229.13 |
| 6,557,917 B1 * | 5/2003 | Colcombe | B60R 9/00 | 224/403 |
| 6,588,826 B1 * | 7/2003 | Muirhead | B60J 7/1621 | 296/100.06 |
| 6,662,983 B2 * | 12/2003 | Lane | B60R 9/06 | 108/44 |
| 6,669,264 B1 * | 12/2003 | Tucker | B60J 7/104 | 296/100.15 |
| 6,695,185 B2 * | 2/2004 | Church | B60R 9/06 | 224/521 |
| 6,846,140 B2 * | 1/2005 | Anderson | B60P 7/0815 | 410/102 |
| 8,177,110 B1 * | 5/2012 | Hines, Jr. | B60R 9/00 | 224/404 |
| D684,917 S * | 6/2013 | Williams | D12/408 | |
| 8,474,767 B1 * | 7/2013 | Nicholls | B60P 7/0807 | 248/200.1 |
| 8,668,124 B2 * | 3/2014 | Kennedy | B60R 9/045 | 224/403 |
| 8,894,127 B2 * | 11/2014 | Garska | B60J 7/102 | 296/100.18 |
| 9,708,014 B1 * | 7/2017 | Ichtchenko | B62D 33/0207 | |
| 9,744,912 B1 * | 8/2017 | Nobert | B60R 11/00 | |
| 10,093,243 B2 * | 10/2018 | Shen | B60R 9/10 | |
| 10,328,778 B2 * | 6/2019 | Aubrey | B60J 7/141 | |
| 10,384,618 B2 * | 8/2019 | Williams | B60R 9/10 | |
| 10,406,900 B2 * | 9/2019 | Facchinello | B60J 7/198 | |
| 10,527,219 B2 * | 1/2020 | Carnevali | F16M 11/14 | |
| 11,034,307 B1 * | 6/2021 | Cunningham | B60R 9/06 | |
| 11,325,540 B2 * | 5/2022 | Gaddis | B60R 9/10 | |
| 2004/0256430 A1 * | 12/2004 | Wang | B60R 9/06 | 224/520 |
| 2004/0262347 A1 * | 12/2004 | Green | B60P 3/07 | 224/403 |
| 2005/0103816 A1 * | 5/2005 | Flannery | B60R 9/06 | 224/509 |
| 2006/0029483 A1 * | 2/2006 | Allen | B60R 9/06 | 410/30 |
| 2006/0277813 A1 * | 12/2006 | Saldana | A01K 97/10 | 43/21.2 |
| 2007/0007316 A1 * | 1/2007 | Witczak | B60R 9/042 | 224/310 |
| 2008/0042027 A1 * | 2/2008 | LaScala | B63B 17/04 | 248/228.6 |
| 2008/0054036 A1 * | 3/2008 | Egigian | B60R 9/00 | 224/403 |
| 2008/0164292 A1 * | 7/2008 | Farney | B60R 9/06 | 224/324 |
| 2009/0255966 A1 * | 10/2009 | Prapavat | B60R 9/00 | 224/403 |
| 2011/0240700 A1 * | 10/2011 | Williams | B60R 9/10 | 224/518 |
| 2011/0278336 A1 * | 11/2011 | Landrum | B60R 9/06 | 224/509 |
| 2012/0000952 A1 * | 1/2012 | Dreger | B60R 9/10 | 224/533 |
| 2012/0027560 A1 * | 2/2012 | Olsen | B60R 9/10 | 414/800 |
| 2012/0111911 A1 * | 5/2012 | Rempe | B60P 3/07 | 224/403 |
| 2013/0075436 A1 * | 3/2013 | Martin | B60R 9/00 | 224/403 |
| 2013/0181023 A1 * | 7/2013 | Shawanda | B60R 9/06 | 224/403 |
| 2014/0034693 A1 * | 2/2014 | Perry | B60R 9/045 | 224/403 |
| 2014/0197653 A1 * | 7/2014 | Stepanians | B60P 3/40 | 296/3 |
| 2014/0263113 A1 * | 9/2014 | Hall, II | B60R 7/08 | 211/70.8 |
| 2015/0083769 A1 * | 3/2015 | Williams | B60R 9/06 | 224/488 |
| 2015/0232041 A1 * | 8/2015 | Wolfe | B60P 3/077 | 224/403 |
| 2015/0329059 A1 * | 11/2015 | Jobe | B60R 9/06 | 224/403 |
| 2016/0090048 A1 * | 3/2016 | Crandall | B60R 9/06 | 224/403 |
| 2025/0050718 A1 * | 2/2025 | Dylewski, II | B60J 7/1607 | |
| 2025/0050800 A1 * | 2/2025 | Biller | B60P 7/14 | |

* cited by examiner

RAIL TOP CARGO MANAGEMENT SYSTEM

BACKGROUND OF THE INVENTION

1. Field of the Invention

The present invention relates generally to the field of vehicle cargo management systems and more particularly to a cargo management system for pickup trucks or open utility trailers. In its most preferred embodiment the present invention relates to a modular, configurable, moveable cargo management system that mounts to the top sill and/or in the corner of a truck bed, open utility trailer, roof or other corresponding vehicle surface. Specifically, the present invention is a cargo management system having a first member, a second member, where the first member and the second member meet in a corner to form an L and are secured one to the other, and where the system has at least one first securement apparatus to secure the first member to a first rail, at least one second securement apparatus to secure the second member to a second rail, at least one receiver on a top of the second member and at least one cargo carrier that is securable to the receiver. The first and second members of this cargo management system ideally meet in the corner where the first member and the second member are secured one to another to form the solid L member. The receiver of this system can receive and secure a cargo carrier and the cargo carrier is ideally a rack having at least one arm. However, in another embodiment the cargo carrier is a rack having at least two arms, that form a V and where the V typically has at least one cargo connector that is moveable along either or both of the arms of the V.

In a second embodiment there is a cargo management system having a first member, at least one first securement apparatus to secure a first end of the first member to a first rail; at least one second securement apparatus to secure a second end of the first member to a second rail; and a receiver system having at least one receiver with a receiver opening positioned on a top of the first member; at least one cargo carrier having an insertable member formed at a bottom of the cargo carrier; the insertable member is matingly insertable into the receiver opening; and where the insertable member is securely affixable within the receiver opening in different positions. This system generally is mounted from side to side in the truck bed.

In a third embodiment of the cargo management system there is a first member, at least one first securement apparatus to secure a first end of the first member to a first rail; at least one second securement apparatus to secure a second end of the first member to a second rail; a receiver system comprising: at least one receiver with a receiver opening positioned on a top of the first member; at least one cargo carrier having an insertable member formed at a bottom of the cargo carrier; the insertable member is matingly insertable into the receiver opening; and where insertable member is securely affixable within the receiver opening in different positions.

RingLocker is integrated into the cargo carrier to both secure the carrier to the truck bed or other mounting surface and to secure the cargo to the carrier. The RingLocker consists of a wire mesh cable that has an oversized ball on one end of the cable and a ring on the opposite end of the cable. A ring end of the cable is fished through a diagonal clamping bracket slot on the carrier and then through a RingPin and/or RingNut and attached to a locking SpinPin shaft where a typical lock prevents the ring end of the cable from being removed. Once installed the RingLocker cable prevents the RingNuts and RingPins from being turned out and disengaged. The RingLocker system also uses a second cable to secure a pair wings or arms to the cargo carrier and cargo to the rack using the over-size ball that jams itself tight in the diagonal slots of the clamp bracket while the ring end of the cable is fished through the RingPins of the wings and the cargo, such as bicycles, then onto the SpinPin for locking.

To secure the insertable member to the receiver is a new tightening and securement system called the SilentLocker, that utilizes a SpinPin and a threaded bolt. This apparatus is designed to securely affix and hold the cargo carrier to the receiver using a unique, hand tightened apparatus.

2. Background of the Invention

Everyone who rides a bicycle wants to take the bike wherever they go, and so we have the bike rack. In fact, there are hundreds of bike racks. There are numerous racks that fit into hitch receivers and they come in a wide variety of sizes. These hitch receivers are wonderful, yet anyone who owns a truck at times needs to utilize the truck hitch to pull a trailer, a camper, or for a variety of other purposes, thereby removing the ability to use the hitch mounted bicycle rack. Also, it is impossible to lower the tail gate when a bike rack is mounted in the receiver. So, in many cases, the user is forced to simply throw the bike in the truck bed where the bike then slides from side to side while driving. To overcome this adverse carry-method a variety of truck bed mounting systems have been invented. However, all of these systems take up much of the truck bed and/or encompass a variety of cumbersome, unorganized, mounting systems. Some drape a tarp-like cloth over the tailgate and then hang the bike over the tail gate, basically leaving the bicycle to bounce up and down on the tail gate. Some have complex systems that require removing the front wheel in order to secure the bike within the bed thus forcing the user to now find someplace to safely store the wheel. Some mount front to back and allow the wheel to stay in place, but in most, if not all cases, the entire truck bed is again occupied by the bicycle rack mounting system and the bicycle or bicycles. Because of these existing limitations there exists a need for a new bicycle rack that finds and utilizes currently unusable truck space to mount bicycles or other cargo.

In addition to the need to utilize this unusable space, there also exists a need to have a better system that still utilizes the truck bed space but that can accommodate more accessories and cargo. The present invention also teaches a rail top mounting system that extends across a truck bed that allows the user to securely and easily carry more cargo than was previously possible.

There is also a need for a system that is modular, moveable and that is adaptable for use in a variety of locations. There is a need to be able to take a cargo carrier and be able to move it to several locations, yet still maintaining its ability to manage or carry cargo at the alternative locations.

In addition to this rail mounted cargo carrier system there is a need to secure the cargo once loaded onto the cargo carrier. The present invention provides solutions to all of these problems.

Because of the above limitations the present invention exists and utilizes that last unused space on a truck or trailer bed. The only space remaining to place an accessory rack is on the top of the truck bed rail. This is an entirely unused space on the truck bed and has never before been efficiently used to mount accessories, such as bicycles, skis, snow boards, rakes, string trimmers, ladders, racks, brooms, shovels or virtually anything else.

The rail in most common trucks in the past had holes spaced around the top of the rail. These existed mainly for inserting poles or some sort of extender that could be made into a panel system to heighten the bed so that the user could carry additional material, such as leaves, wood, furniture, etc. in the bed without the load spilling over the side. The user could also use them to string rope or other line material through the slots in the holes in order to tie down loads. Some people did actually use these to place poles within and then hang ladders, shovels, brooms, rakes, etc. However, these carriers were typically not truly secure or professionally designed and were generally unsafe. There has never been a system designed specifically to utilize the space above the truck rails to carry cargo. There has never been a system designed to utilize the corner of the rail top or three top rails. The present cargo management system can also be used with a truck bed but can also be used with an open box trailer. There has never been a cross bed, rail top mounting system available to securely carry a wide variety of cargo or with a removeable, configurable cargo carrier. There has never been an easy means to secure cargo and the system to the truck or trailer.

SUMMARY OF THE INVENTION

L-Mount Carrier. The present invention is a rail top cargo management system and cargo securement system that has three similar embodiments and utilizing similar means to secure each of the three embodiments to the rail top. The systems can also be configured to work with a tonneau cover. The invention also includes a way to use a specially designed cable system to secure cargo to the management system. It includes an apparatus to tightly and securely fasten the cargo carrier to the cargo carrier receiver. It also includes a way to prevent bike sway when bicycles are hung from a bicycle carrier.

Specifically, it is first a cargo management system having a first member and a second member, where the first member and the second member meet in a corner, and where the system has at least one securement apparatus to secure the first member to a first rail, at least one second securement apparatus to secure the second member to a second rail, and at least one receiver on a top of one of the members. The receiver is designed to receive and accept a variety of cargo carriers. This two-rail, L-shaped, mounted cargo management system is designed specifically to mount on rail tops, and more specifically, it is designed to be mounted on rail tops typically found in a truck or a trailer. More specifically, it is designed to mount on rail tops that are the top of a side wall and a top of a front wall so that they meet in a corner where the side rail and the front rail meet, forming an L in a corner.

Cross Body Mount. A second embodiment is a rail top mounted cargo management system that is designed to have securing members mounted on opposing sides of a truck bed or cargo trailer with a cross-member that extends between the opposing sides and that is secured to the two top mounting members. The cross member has at least one receiver affixed thereto that can receive and accept a variety of cargo carriers. In both embodiments the first and second members are connected to the truck bed with novel adjustable clamps, channel nuts and novel clamping brackets. The member connectors are also part of the locking system for locking the cargo management invention and its contents to the truck bed. The second embodiment is adjustable in width to fit all truck bed sizes.

Three Quarter Mount and Full Box Mount. A third embodiment is a rail top mounted cargo management system that is designed to have securing members mounted on opposing sides of a truck bed or cargo trailer with a cross-member that extends between the opposing sides and that is secured to the two top mounting members. The cross member has at least one receiver affixed thereto that can receive and accept a variety of cargo carriers. In this embodiments the first and second members are connected to the truck bed with novel adjustable clamps, channel nuts and novel clamping brackets. The member connectors are also part of the locking system for locking the cargo management invention and its contents to the truck bed. This third embodiment is adjustable in width to fit all truck bed sizes. This third embodiment has the second members attached to the first member in an offset manner, so the cargo management system can be position anywhere on the truck bed with the cross member oriented closer to the truck cab, or closer to the truck endgate. In fact, the cross member can be positioned over the top of the tailgate, or it can even be positioned beyond the tailgate such that it extends past the end of the truck bed, for full bed clearance while carrying cargo either across or in line with the centerline of the bed. If extended beyond or outside the tailgate, it can have an additional cross member to further facilitate cargo management, such that the entire system forms a box around the entire periphery of the truck bed or a box that extends beyond the end of the truck bed.

RingLocker. This system further includes a wire locking system, or RingLocker. The RingLocker system is a unique cargo securement system that uses flexible cable and rings. The rings are attached to threaded posts and nuts and these posts and nuts are used to secure the cargo management system to the top rail and even the cargo to the cargo management system. The cable has a solid end and a loop end. The solid end is jammed tight to the cargo management rail mounting structure. To utilize this system the flexible cable is threaded through the rings such that the loop end passes through the rings and the cargo (such as bicycle wheels or frame). It is then locked by a base member securing pin.

SilentLocker. Finally, the system includes a securing apparatus to tightly and securely affix the cargo carrier to the receiver. This apparatus allows for easy hand tightening but yet provides unapparelled security and strength to the apparatus connection to the receiver.

Zero-g. Finally, the system has a zero-G™ anti-sway system. When used, the V shaped cargo carrier has at least one horizontal bar adjustably affixed near the bottom of the V that a bicycle wheel can rest against. This bar and accompanying securement strap provide a simple, but unique apparatus that provides stability and prevents swing, sway and motion when the bicycle is hung by its wheels on a bicycle connector on the cargo carrier.

These new cargo management systems thus include a variety of improvements over existing technology. These improvements include: corner mounting system; the cross bed mounting system; the ¾ mount, multi-positionable mounting system; the RingLocker™ securement system; the RingPin™ system attachment system; and the zero-G™ anti-sway system.

How the foregoing and further objects of the invention are accomplished, individually and in various combinations, will be described in the following detailed description of the preferred embodiment taken in conjunction with the drawings. Other ways in which the features of the invention are accomplished will become apparent to those skilled in the art after they have read this specification, Such other ways are deemed to fall within the scope of the invention if they fall within the scope of the claims which follow.

6

Figure 20:
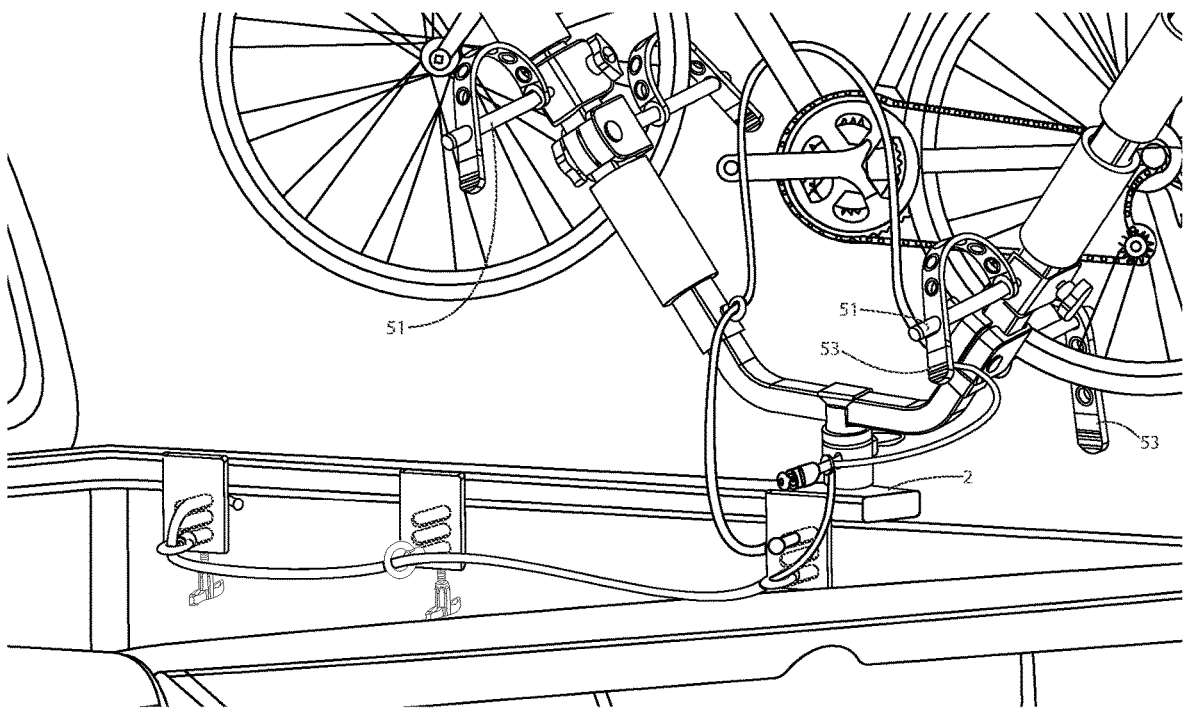

FIG. 20 is another perspective, side view of the L-shaped corner mounting system showing the RingLocker attached to both the bicycle and the L-shaped mounting system.

FIG. 21(a) is a perspective view of the RingLocker showing a circular flat end being threaded through a hole.

FIG. 21(b) is a view of the RingLocker showing the ball end unable to thread through the same hole.

FIG. 21(c) is another view the RingLocker, this time showing circular flat end when placed over a threaded pin used to secure the cargo carrier mounting base to the cargo carrier.

Figure 22:
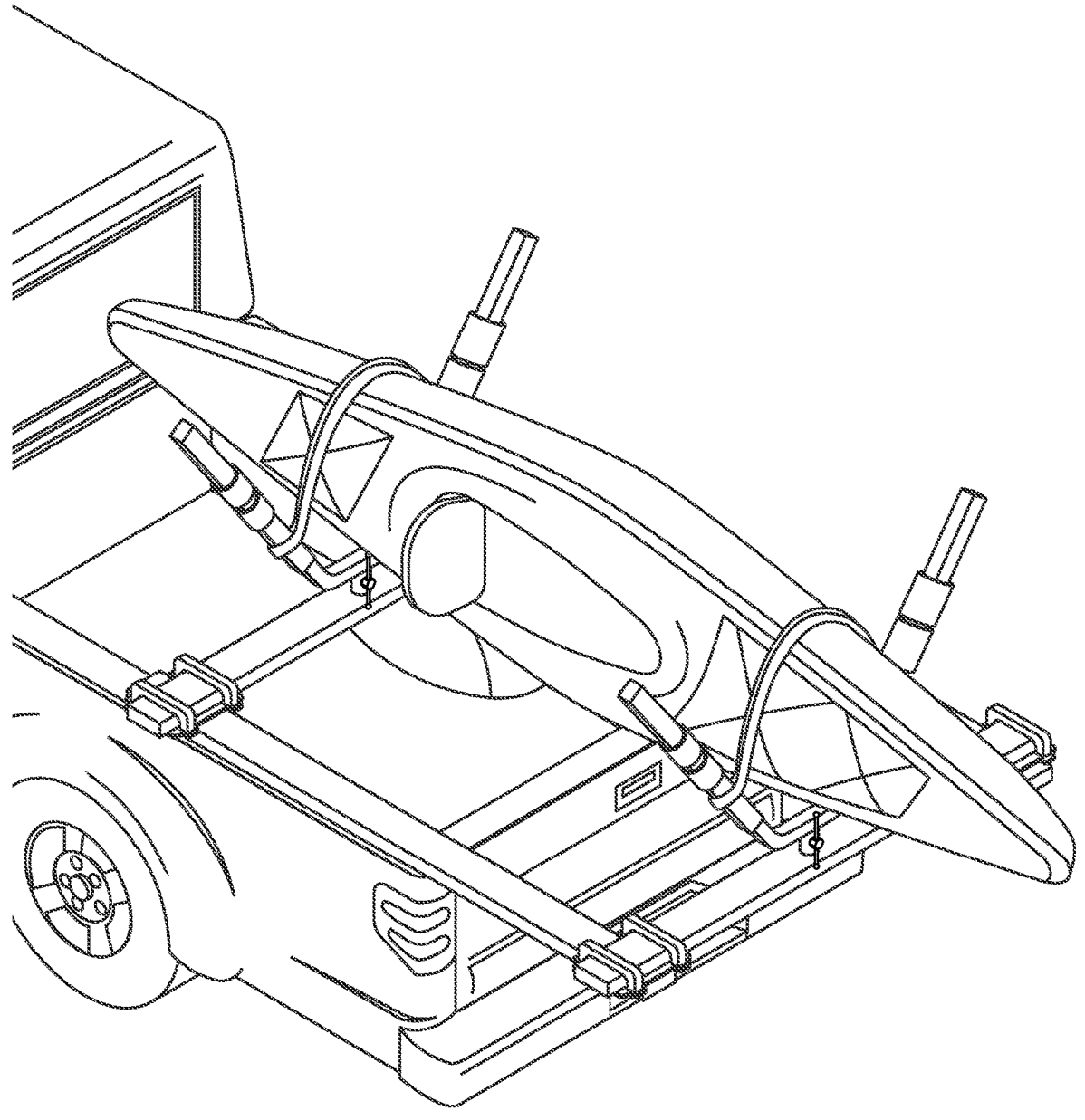

FIG. 22 is an elevated perspective view of the cargo carrier system with a kayak.

Figure 23:
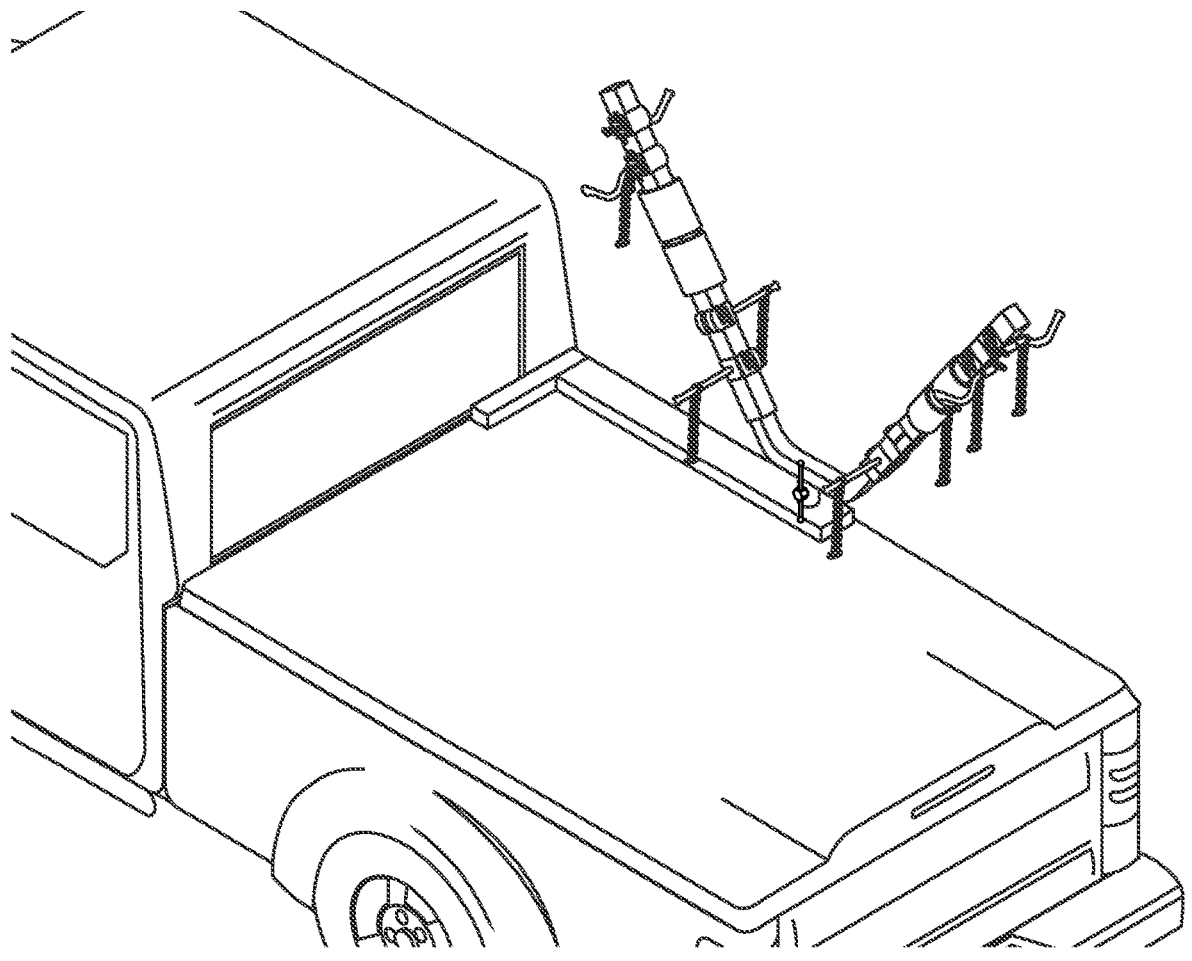

FIG. 23 is an elevated perspective view of the cargo carrier system installed on the top of a tonneau cover.

Figure 24:
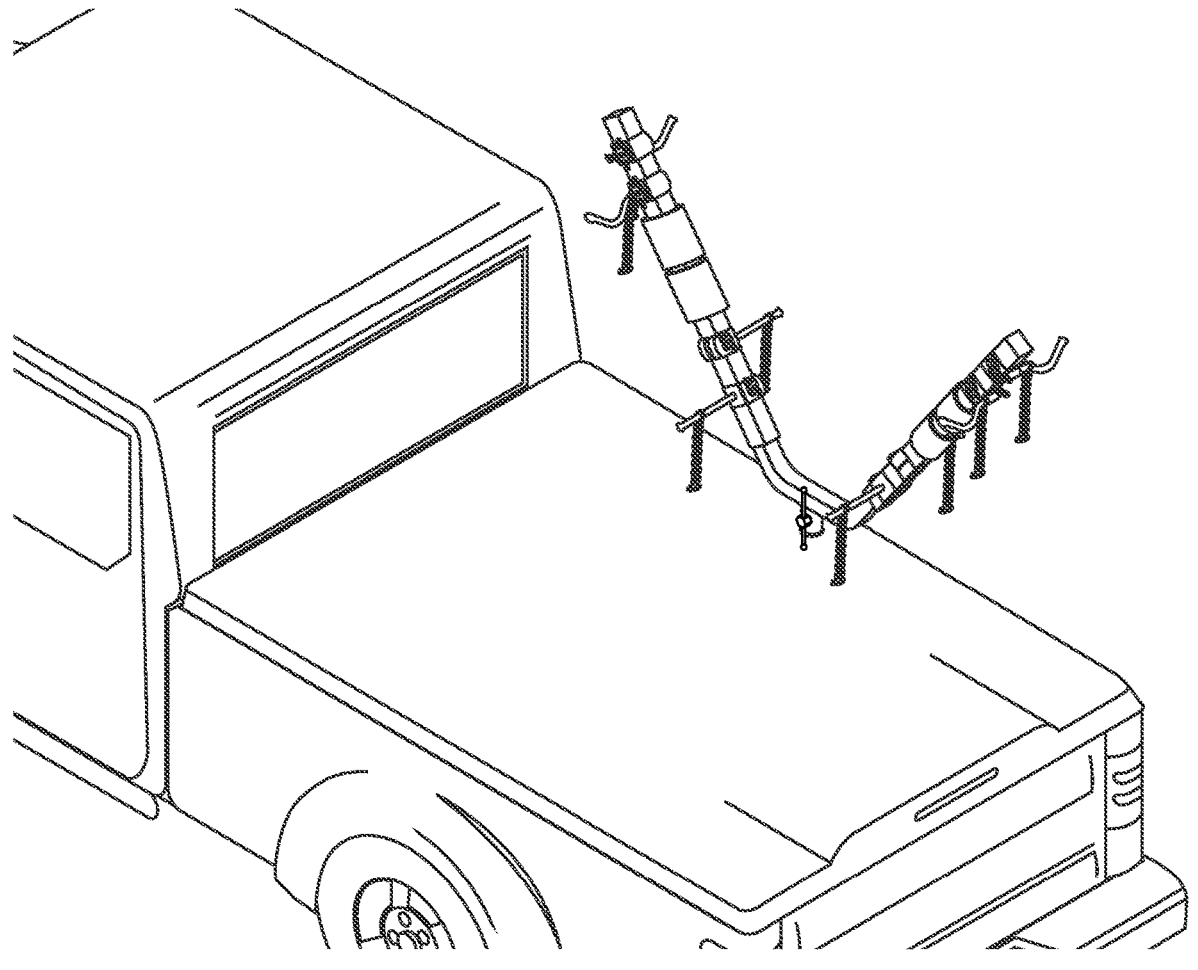

FIG. 24 is an elevated perspective view of the cargo carrier system integrated onto a truck tonneau cover.

DETAILED DESCRIPTION OF THE EMBODIMENTS

Figure 10:
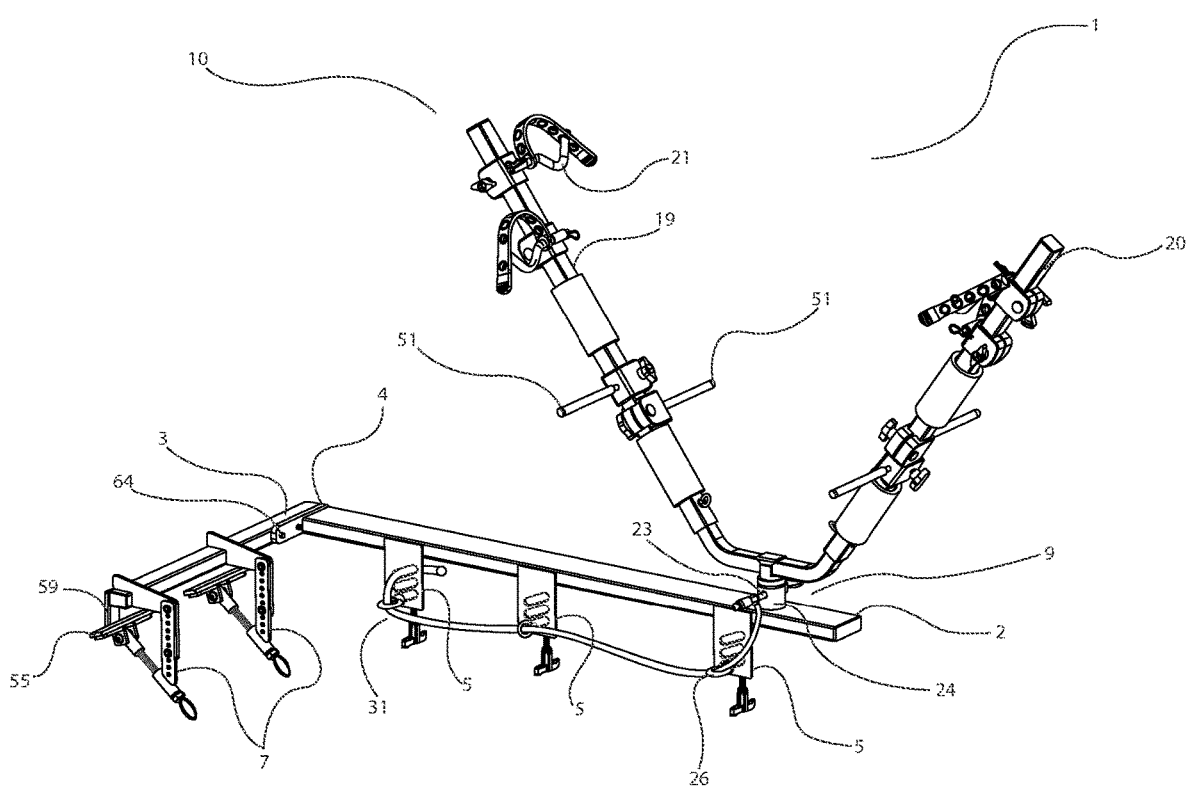
FIG. 10 is a perspective view of the L-shaped corner mount system, showing the V-shaped cargo carrier, corner mount, the RingLocker system and the zero-g system.

L-Shaped Mount. The present invention, as shown in FIGS. 10-20, is a cargo management system 1 having a first member 2, a second member 3, where the first member 2 and the second member 3 meet in a corner 4 to form an L and are secured one to the other, and where the system 1 has at least one first securement apparatus 5 to secure the first member 2 to a first rail 6, at least one second securement apparatus 7 to secure the second member 3 to a second rail 8, at least one receiver 24 on a top 11 of the first member 2 and at least one cargo carrier 10 that is securable to the receiver 24. It is preferable that the receiver 24 be welded or permanently affixed or secured to the member, however, it is possible that the receiver 24 be affixed instead to a moveable part that can be fitted onto the member, thus allowing the receiver 24 to be positioned at any point on the member and this also allows for numerous receivers 24 to be added to or removed from the member. The first and second members 2, 3 of this cargo management system 1 ideally meet in the corner 4 where the first member 2 and the second member 3 are secured one to another to form a solid L-shaped member. The receiver 24 of this system 1, as shown in FIG. 19, can receive and secure a cargo carrier 10 and the cargo carrier 10 is ideally a rack having at least one arm. However, in another embodiment the cargo carrier 10 as shown in FIG. 10 is a rack having at least two arms, 19, 20 that form a V and where the V typically has at least one cargo connector 21 that is moveable along either or both of the arms of the V 19, 20. This allows the system 1 to accommodate a large variety of cargos, including different sized bicycles, snow boards and yard tools, just to name a few. In addition, the arms 19, 20 of this system can be adjustable lengthwise. In other words, the arms 19, 20 can be extended outwards to make longer arms. These arms 19, 20 could also be angularly adjustable so that they could be used as a straight, linear line, or they could be at any angle in between flat and totally vertical.

In a slightly different configuration, the member that runs on the top of the side rail could extend the entire length of the truck bed. It is possible to have more than one V shaped cargo carrier 10 attached to this member. For example, it is possible to secure two cargo carriers 10 that could carry four bicycles on the Vs or they could carry two kayaks. Kayaks can actually be carried in two different ways. First, the cargo carrier 10 can have a cargo attachment apparatus designed specifically to secure a kayak so that a kayak could be attached to both sides of the V. Alternatively, the Vs could be spun so that the one leg of the V is pointing to the inside of the truck bed and the other pointing outside the truck bed. It is then possible to simply hang or secure a kayak in the crotch of the V.

It is also possible to use this same configuration with a tonneau cover. A first configuration, as shown in FIG. 23, is to secure the members to the top, and in the corner of the tonneau. In other words, the L-shaped member is positioned on top of and in the corner of the tonneau cover. This requires drilling several holes through the tonneau. It is also possible to have the rail members attached between the tonneau cover mount and the truck bed rails. In this embodiment the cargo carrier is configured to fit outside and around the tonneau cover. Alternatively, a single hole is drilled in the tonneau cover for the receiver 24 to fit therethrough. In this configuration the receiver 24 is slightly longer than in the first described configuration so that the receiver 24 protrudes through and past the tonneau cover, as shown in FIG. 24. In this configuration the cargo carrier, when attached, locks the tonneau cover down and in place. To raise the tonneau cover it is necessary to actually remove the V shaped cargo carrier from the receiver 24. Once removed the tonneau cover will simply lift up and the receiver 24 will slide through the hole. These same configurations can be used for any of the following embodiments as well.

This removability leads to another very important aspect of this invention and that is that the cargo carrier 10 is portable. In other words, it can easily be removed from the cargo management system's receiver 24 and placed in another application elsewhere. Related inventions provide for the cargo carrier 10 to be used with a stationary bike tree stand, mounted on a trailer tongue, used as part of a "jack-it" system, as defined in patent application Ser. No. 15/410,443, or as part of the one bar system or ¾ mount systems described hereinbelow.

Figure 12:
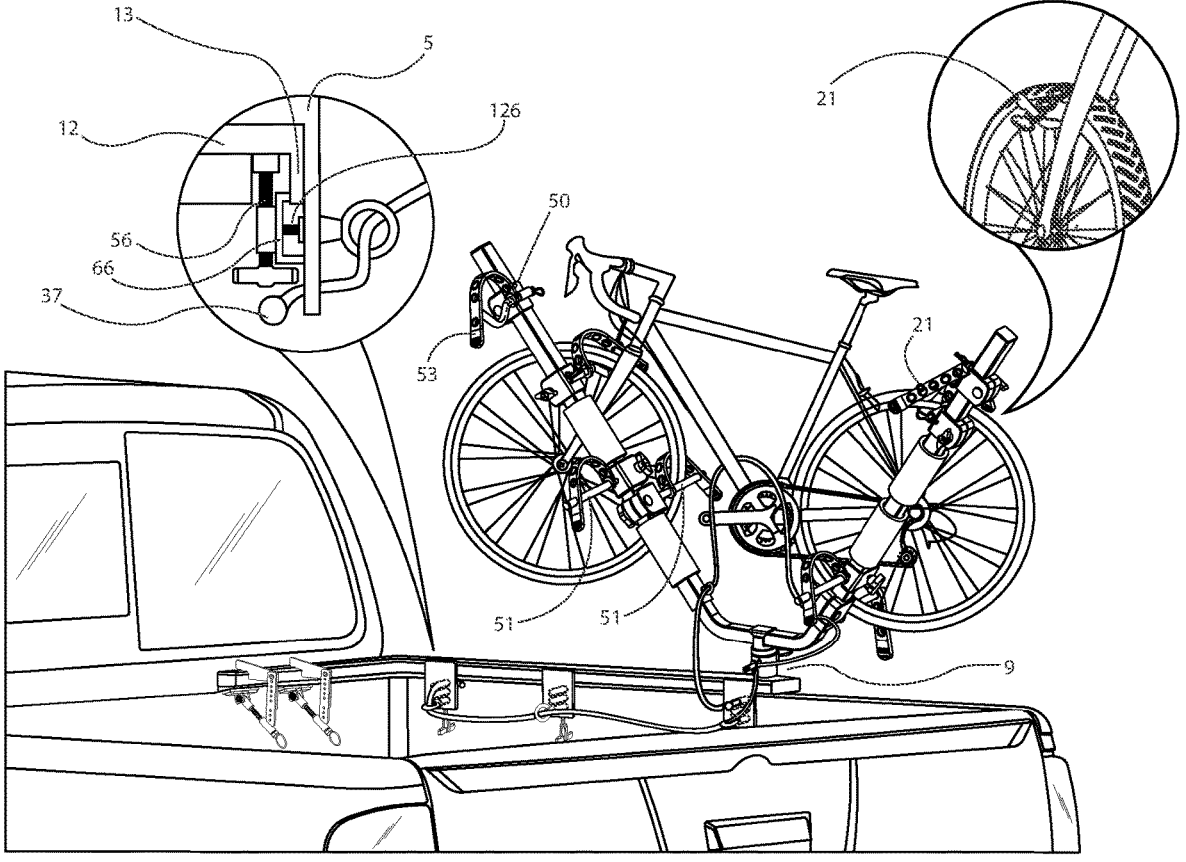
FIG. 12 is another perspective view of the L-shaped corner mount system showing the V-shaped cargo carrier, with blow ups of the RingLocker and the upper zero-g horizontal bars.
Figure 13:
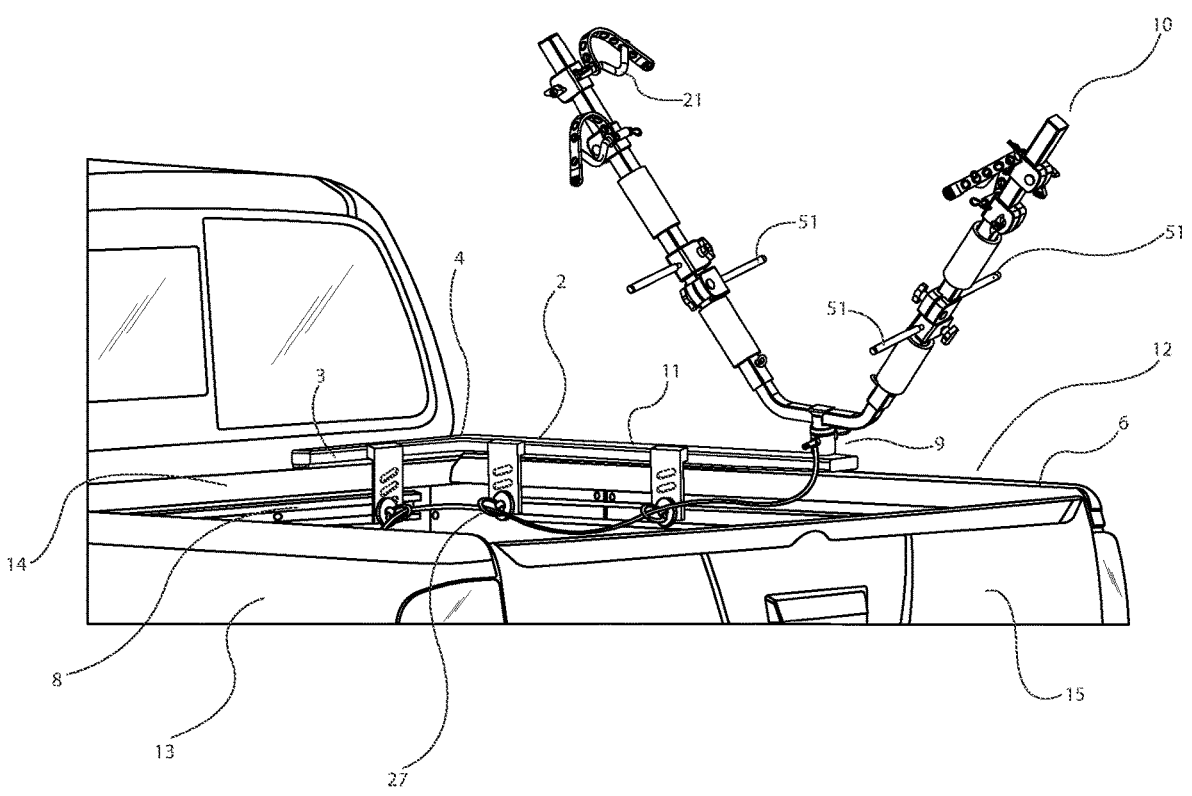
FIG. 13 is another perspective view of the L-shaped corner mount system with the V-shaped cargo carrier attached, RingLocker and zero-g bars.

Truck beds are designed to flex independent of a truck cab and can generate strong torsional forces. As shown in FIGS. 12 and 13, the cargo management system 1 of the present invention carries its load above the side sill of the truck bed and the seemingly small movements of the truck bed are amplified by the weight and height of the load carried by the cargo management system 1. This dynamic motion necessitates securing the cargo carrier to the truck bed rails securely so that any latent inertia from the elevated weight of the loaded carrier system in both the longitudinal and lateral planes is minimized or eliminated. The L-shaped design of the preferred embodiment transfers these latent motions directly to the truck bed 12 where they are absorbed by the structure of the rails 6, 8 and the truck bed 12. In FIG. 12, the left side bubble shows a cross section of the double acting clamp and the termination design of the cable locking system in the slot mounting plate 41. The upper right bubble shows how the carriers cargo carrying elements secure a bicycle wheel and tire.

The cargo management system 1 described above is specifically designed for mounting on the top rails 6, 8 of a truck bed side and front walls. A typical truck bed 12 has walls surrounding the bed 12 and specifically, the bed has three walls and a tail gate 15. These walls include two opposing side walls 13, a front wall 14 that is positioned directly behind the truck cab, and the tail gate 15, that is obviously positioned at the rear of the truck and that is used to allow entry to the truck bed 12. The present embodiment of the cargo management system 1 has the first member 2 and the second member 3, and the first member 2 mounts on the top of one of the side walls where this wall top forms first rail 6, and then the second member 3 mounts to the top of the front wall 14, that forms second rail 7. These two members 2, 3 meet and are securely joined together in the corner 4 and when joined form an L shaped member.

The current truck industry for the United States includes basically six truck brands: Ford, Chevy, GMC, Dodge Ram, Toyota, Nissan and Honda. Because of the variety of trucks there are obviously a variety of beds and rails. This invention includes differing mounting systems for each of these different rail and bed styles, but it should be noted that in all systems the end result is the same, and that is securement of the cargo management system to the truck top rail.

Figure 11:
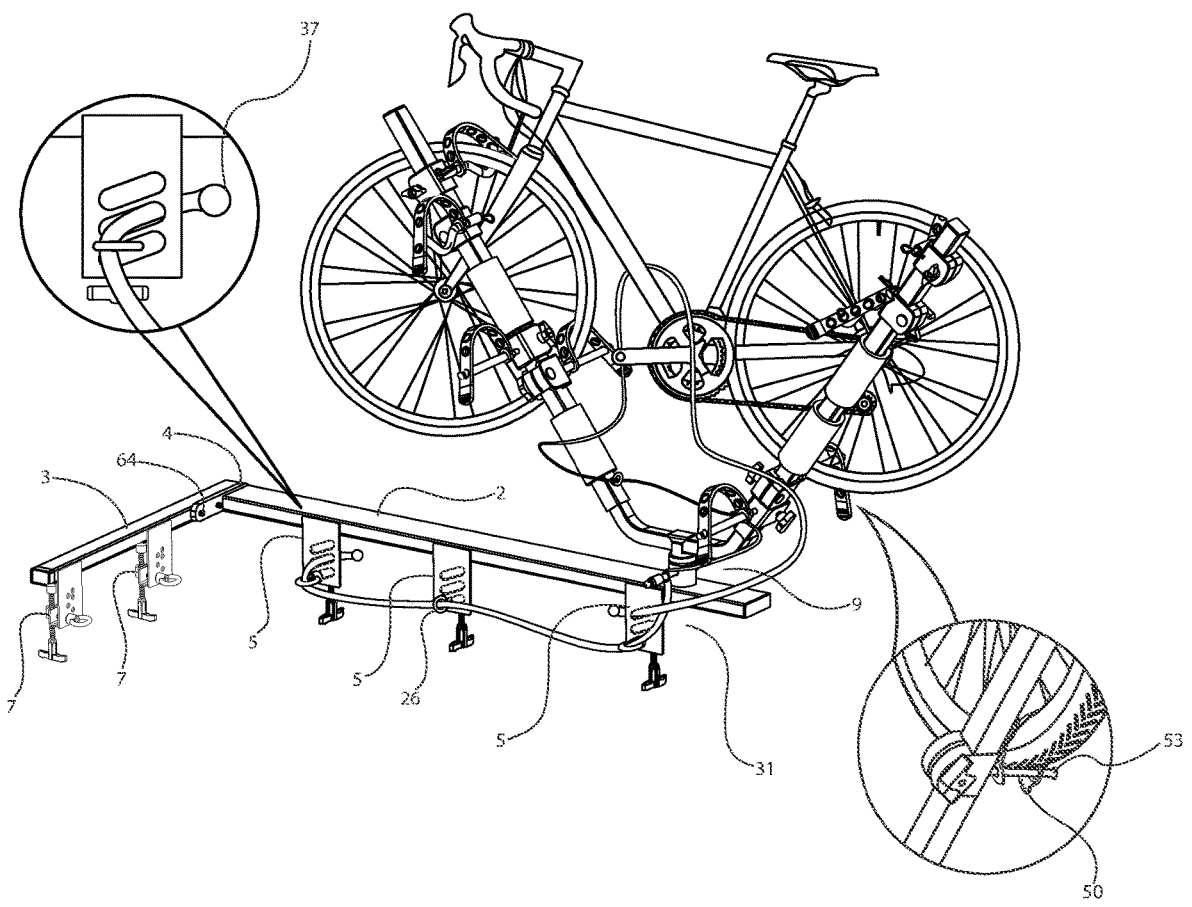
FIG. 11 is a perspective view of the L-shaped corner mount system showing the V-shaped cargo carrier, blow ups of the RingLocker and the lower zero-g horizontal bars.

Reference is made now to FIGS. 11 and 12. In this mounting system embodiment of the present invention the first member 2 is secured to the side wall 13 and first rail 6 of the bed 12 with the first and second securement apparatuses 5, 7 that in the preferred embodiment are an adjustable double acting clamp system that utilizes a combined vertical and horizontal clamp force. The connection media includes a loop or RingPin 26 for hand attachment and removal and this RingPin 26 is one of the components in the RingLocker locking system 31 that prevents theft of the cargo carrier 10.

Figure 16:
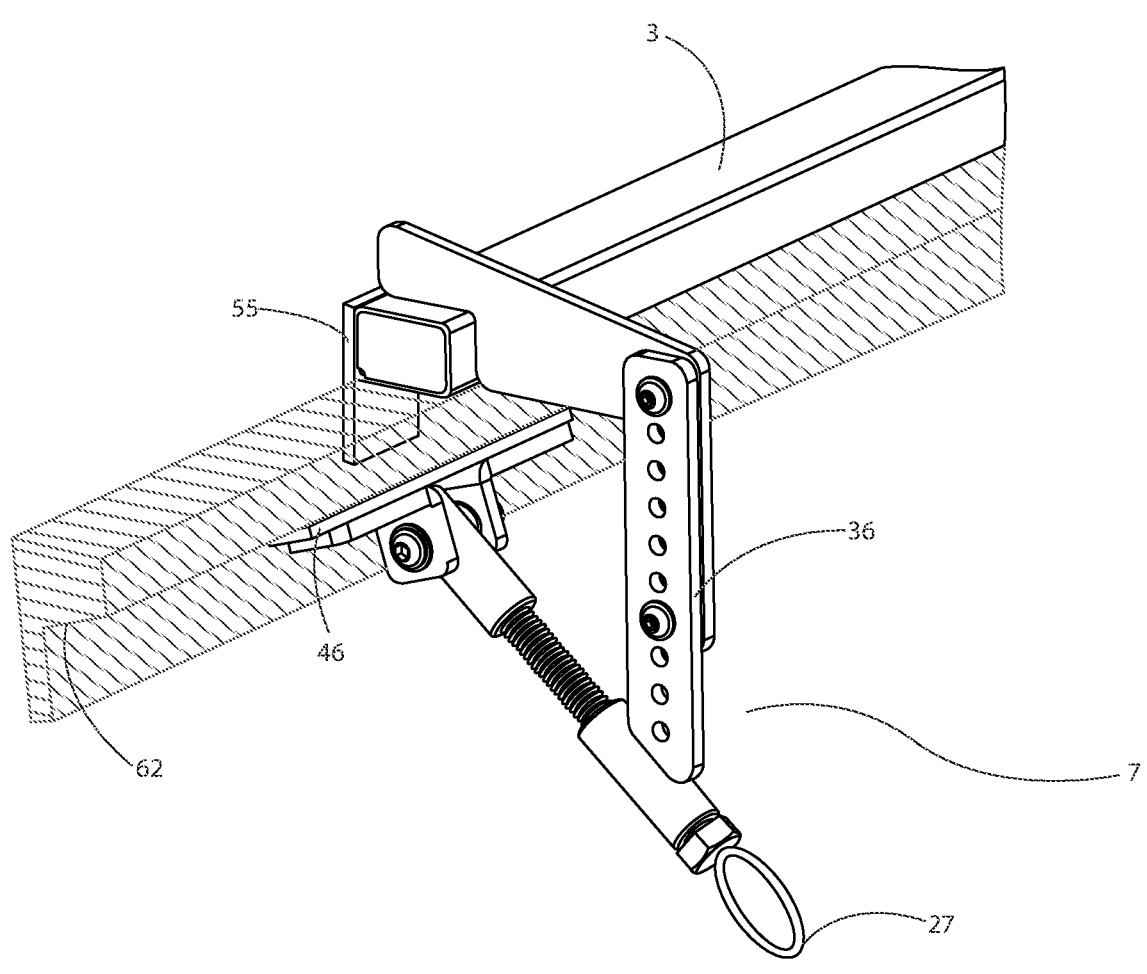
FIG. 16 is a perspective view of an embodiment of a rail connector.
Figure 17:
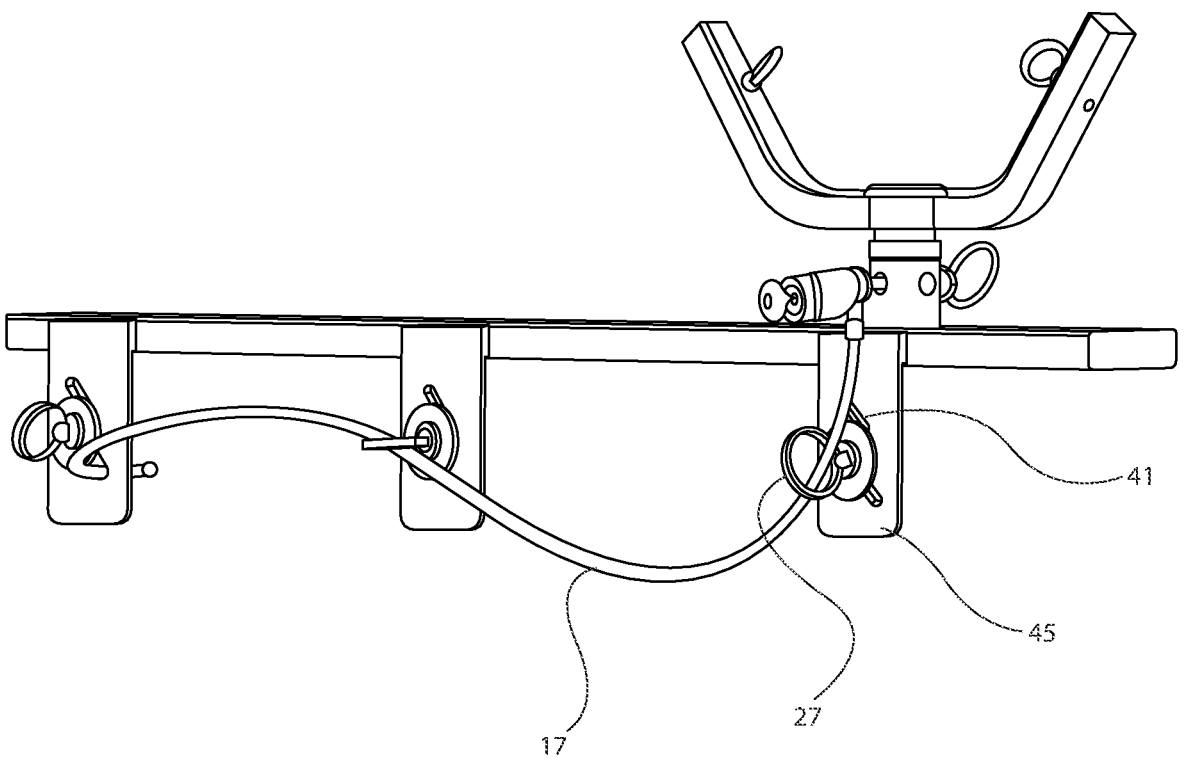
FIG. 17 is a perspective, side angle view of a rail system connected to a rail, showing the RingLocker system, the lockable SpinLocker or SpinPin and the cargo carrier mounting base receiver.

In FIG. 16 the second member 3 stabilizes the first member 2 on the front wall 14 by utilizing a stop plate 55 that fits between the truck cab and the front wall 14 of the bed 12 and adjustable angular acting wedge component 36 that interfaces against an angular return of the truck bed 12 and includes the ring lock 26 for hand install and theft prevention. The embodiment as shown in FIG. 13 is secured to the truck bed 12 rails with ring shaped pins 27 and nuts 43 that fit into a C-Channel rail 8 and 42 utilized in some truck beds 12.

The L-shaped embodiment of the invention is secured to the side wall of the bed 12 with an adjustable double acting clamp system 5, as shown in FIG. 12, that utilizes a combined vertical and horizontal clamp force. The horizontal component 126 draws the clamping plate 5 firmly against the inside return edge of the truck bed, as shown in the upper left bubble of FIG. 12, while the vertical component 56 compresses the second member down onto the top surface 12 of the truck bed side wall.

Figure 18:
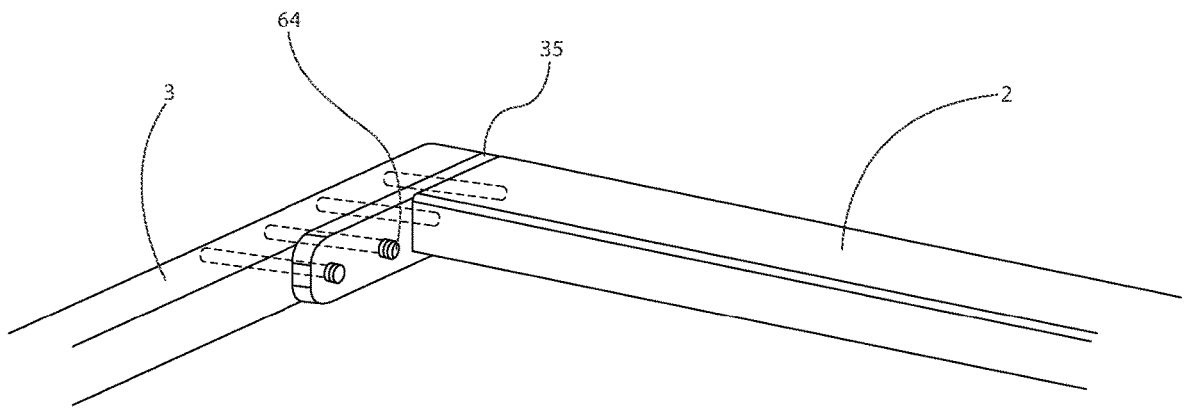
FIG. 18 is a perspective 3D view of the L-shaped corner mount system showing one means to connect the L legs together.
Figure 19:
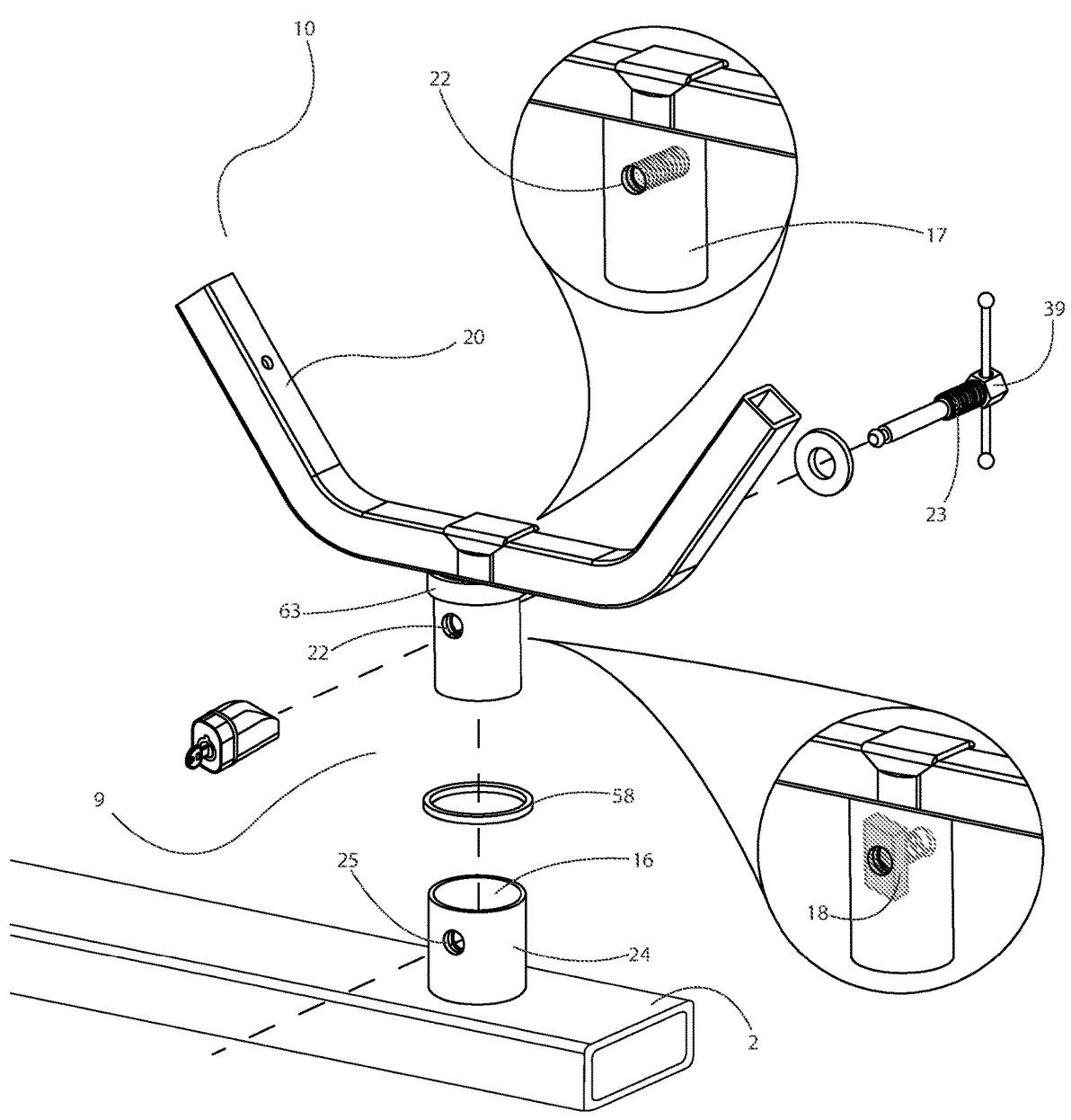
FIG. 19 is an exploded view of the V-shaped cargo carrier mounting base.

The L-shaped embodiment features the corner connection, as shown in FIG. 18, where it is shown that the L members contain a threaded plate 35 welded to the front of member 2 into which bolt 64 extend from the inside of member 3 to engage the threaded plate.

In the first preferred embodiment described above the cargo management system 1 has the receiver that forms part of a receiver system 9 built into at least one of the first or second members. As shown in FIG. 19, this receiver system 9 ideally has a receiver 24 with a receiver opening 16, an insertable member 17 that is formed at a bottom 18 of the cargo carrier 10 and where the insertable member 17 is matingly insertable into the receiver opening 16, and where the insertable member 17 can be securely affixed within the receiver opening 16. The friction ring 58 fits between the SpinRing 63 and the top of the receiver 24 to protect the finish on both the receiver 24 and the friction ring 58.

Figure 1:
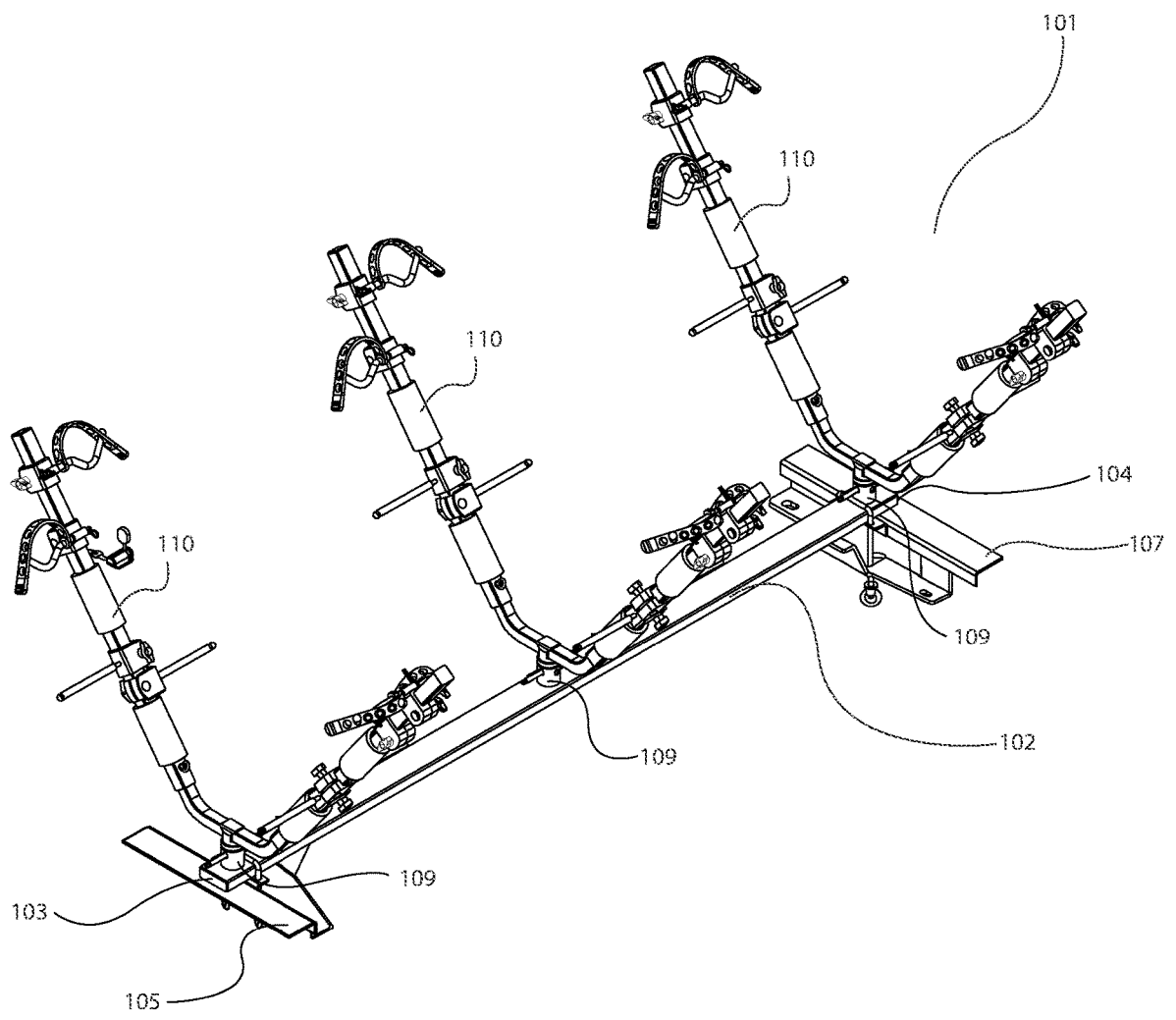
FIG. 1. is a perspective view of the across mount system that features a first member with cargo carrier receivers and an attachment system that is adjustable in width and universally attachable to all pickups sold after about 1960, with no tool/no drill installation.
Figure 2:
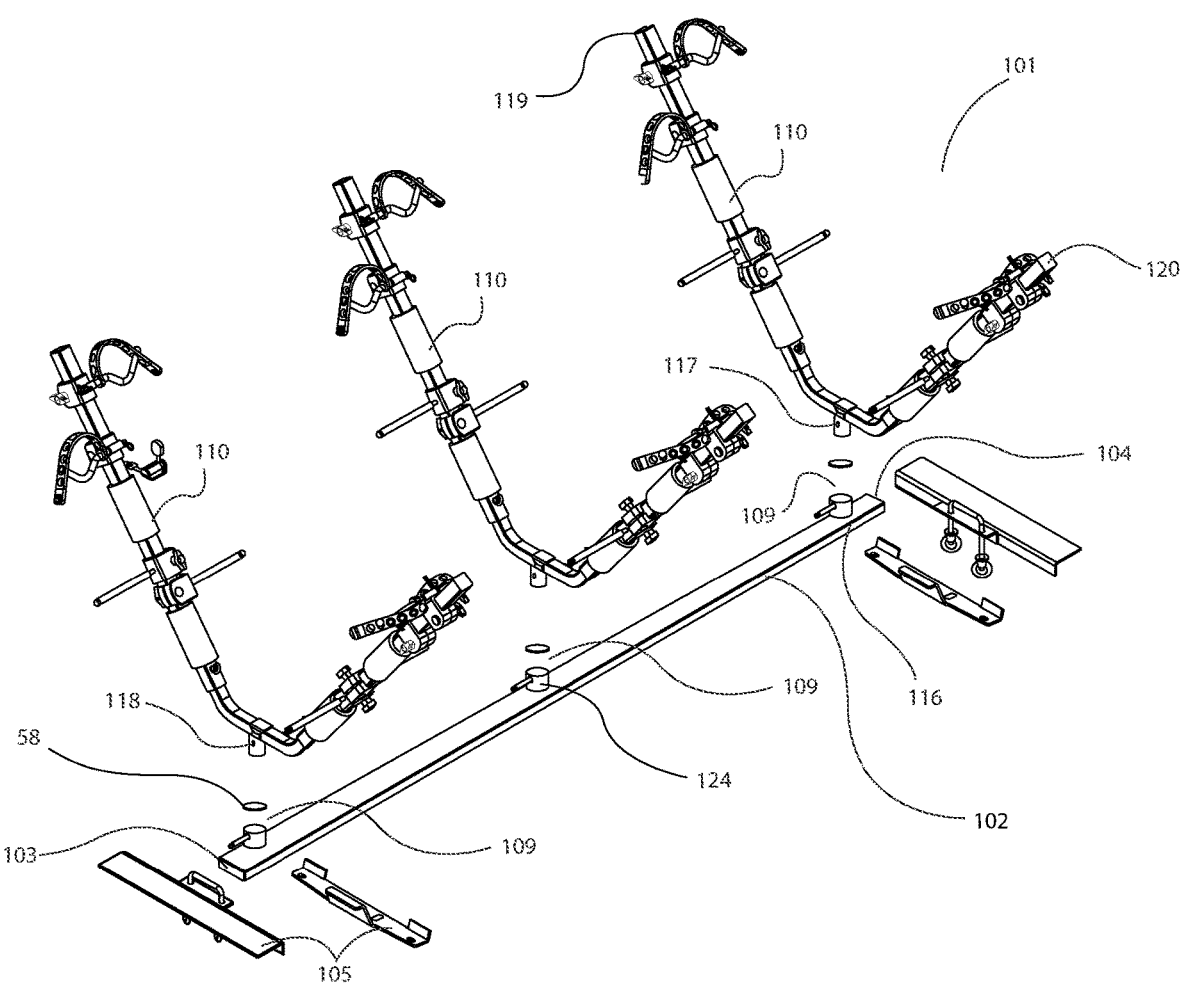
FIG. 2 is an exploded perspective view of the various parts for the cross-mount system of FIG. 1.

FIGS. 10-13 clearly show the cargo carrier 10 both alone and when used with a bicycle attached. FIG. 2 also shows the cargo carriers 10 when not connected to the cargo base members. The cargo carrier 10 can be a single arm, a sling, or other shapes, but ideally it is a V shaped apparatus having a first arm 19 and a second arm 20. Further, the cargo management system 1 has at least one cargo connector 21 for mounting, hanging, or securing cargo and where the cargo connector 21 is moveable along the length of either of the first arm 19 or the second arm 20. The cargo carrier 10 can also have the zero-g bars 50, 51 that are positioned near the bottom of the V and are used to stabilizer a bicycle when attached. In operation, the bicycle is hung by the top inside of its wheels on adjustable cargo connectors 21 and then the bottom of the bicycle wheels rest against the lower adjustable zero-g bars, one for the front wheel and one for the rear wheel. These adjustable bars stabilize the bicycle and prevent motion and vibration during transportation. These bars also have straps 53 that are wrapped around the bicycle wheel to further secure the wheel to the zero-g bars 50,51 in an upper and lower position on each wheel.

In one embodiment the receiver opening 16 is a round hollow tube that is welded to one of the cargo carrier members, but is usually mounted to the cargo carrier first member 2. Alternatively, instead of the weld on fixed position, the receiver opening could be a bolt on accessory. In this embodiment, it is possible to add on as many receiver mounts as will fit across the bar and the means to secure the receiver mount to the bar could be a compression fitting or a screw down device, or any other means that would provide for secure connection to the carrier member. The insertable member 17 is sized to matingly fit inside the receiver opening 16. This allows the carrier to be portable and to rotate. By allowing the cargo carrier 10 to rotate, it allows the user easy access to both the bed side and ground side of the carrier 10, thus making loading and unloading of cargo an easy process while standing on the ground or in the bed. The cargo carrier mounting tube, or receiver opening 16, uses either built in threads or a threaded attachment element, such as an insertable nut 22 into which a common and lockable threaded pin 23 or SpinPin is used to both secure and lock the insertable member 17 to the receiver opening 16 and by using the threaded engagement it removes all motion from the connection. The receiver opening 24 can be cross drilled at 90-degree increments so that the cargo carrier can be positioned either in-line or across the truck bed. The insertable member provides a threaded engagement complimentary with a threaded pin to clamp the outside surface of the insertable member tube to the inside surface of the receiver tube. As these convex tube surfaces are drawn together the radial surfaces of the tubes restrain motion.

FIG. 10 shows the cargo carrier 10 of the preferred embodiment that uses the V shaped design with upwardly angled first and second arms 19, 20 or wings, into which a variety of cargo connectors 21 can be attached. These cargo connectors 21 can be hooks, mounts, clips, or any other type of connector and these cargo connectors 21 can be attached at different locations along the lengths of the V in order to carry a wide variety of objects, such as bicycles, ski's, kayaks, water and snow boards, ladders, racks, string trimmers, fishing rods, lumber, tubing, soft bags, hard cases and any object capable of being lifted onto the carrier and secured by the attachment media. The receiver 24 also has the unique ability to be rotated 360 degree's in one embodiment and rotated 360 and tilted 90 degrees in another embodiment. This spinning and tilting function provide a wide range of functional advantages related to convenience, access, compactness and functional uses.

The Cargo Carrier 10 of the preferred embodiment secures to the truck bed using multiple attachment media. These media both clamp the cargo carrier to the truck bed and concurrently compress the cargo carrier to the truck bed. The type of attachment media depends upon the type of truck bed utilized. The securing media are metallic based and use common threaded fasteners that provide ample torque and force loads to prevent any motion of the cargo carrier on top of the truck bed.

Figure 14:
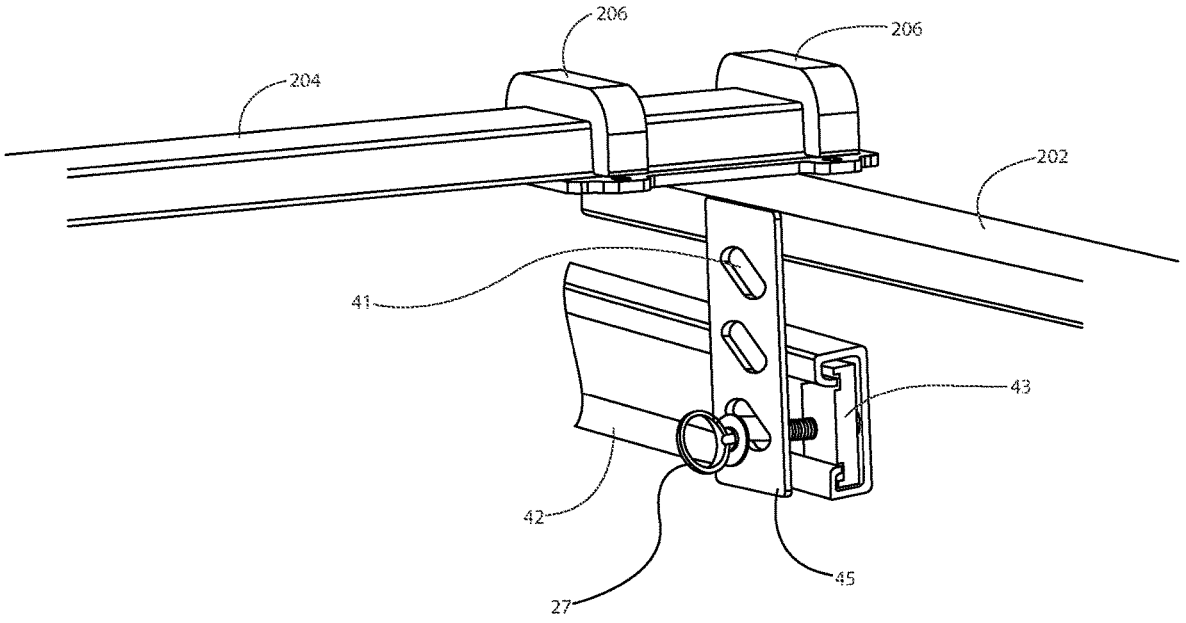
FIG. 14 is a close up image of a channel connector that is used to affix the mounting system to a C-Channel.
Figure 15:
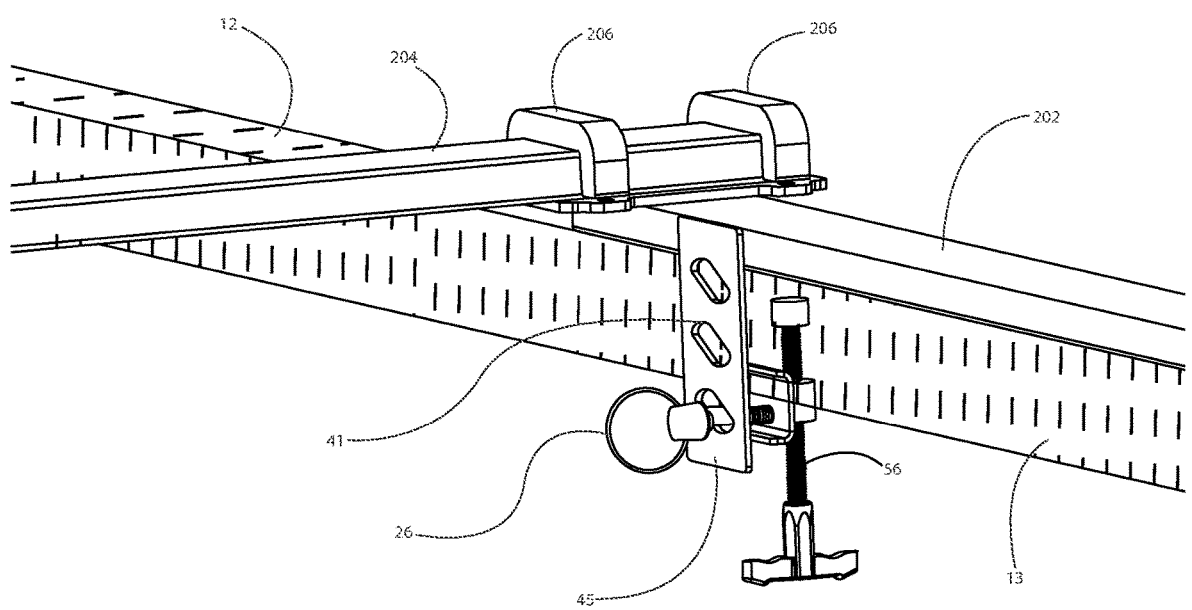
FIG. 15 is a close up image of a different connector that is used to affix the mounting system to a rail.

As shown in FIGS. 14 and 15, an attachment media plate 45 is welded to the cargo carrier and features multiple diagonal slots 41 into which the securing media can be adjusted to fit all truck bed side sill profiles. The securing media feature a round ring or loop 26 to permit hand tightening of the media onto the truck bed to adequately torque load the cargo carrier to the truck bed for motion restraint. Moreover, the diagonal slots 41 are designed to force the first member and the second member into the L shaped corner if any motion of the assembled first and second members occurs due to loosening of the attachment media. This functions as an inherent and latent safety device.

The cargo carrier 10 attachment media features a common way to move and attach the carrier 10 for modular use. This modularity is a key value of the invention by way of allowing the carrier 10 to be moved from vehicle to vehicle, from truck bed to roof top, from roof top to receiver hitch and from receiver hitch to an off vehicle stand as example of this modularity.

Cross Mount. In another embodiment of the truck bed mounting system 101 the system mounts across the bed from side to side rather than as an L corner mount. As shown in FIGS. 1-5, in this embodiment there is a cargo management system 101 having a first member 102, at least one first securement apparatus 105 to secure a first end 103 of the first member to a first rail 106, at least one second securement apparatus 107 to secure a second end 104 of the first member 102 to a second rail 108, a receiver system 109 having at least one receiver 124 with a receiver opening 116 positioned on a top of the first member 102, at least one cargo carrier 110 having an insertable member 117, that is preferably threaded, formed at a bottom of the cargo carrier 118, where the insertable member 117 is matingly insertable into the receiver opening 116 and where the insertable member 117 is securely affixable within the receiver opening 116 in different positions and where the insertable member has a stop ring 63 and friction bushing 58 attached to insure positive alignment with the receiver 24. The receiver 24 is cross drilled so that the cargo management system can be oriented either across or in-line on the truck bed.

In one embodiment the receiver opening 116 is a round hollow tube that is welded to the cargo carrier members. Alternatively, instead of the weld on fixed position, the receiver opening could be a bolt on accessory. In this embodiment, it is possible to add on as many receiver mounts as will fit across the bar and the means to secure the receiver mount to the bar could be a compression fitting or a screw down device, or any other means that would provide for secure connection to the carrier member.

This system can also have a function where the insertable member 117 can be pivoted from zero to 90 degrees. Also, it is preferred that this cargo management system 101 has a cargo carrier 110 that is a V shaped apparatus having a first arm 119 and a second arm 120 and where the cargo carrier 110 is moveable along a length of the first member 102.

Figure 3:
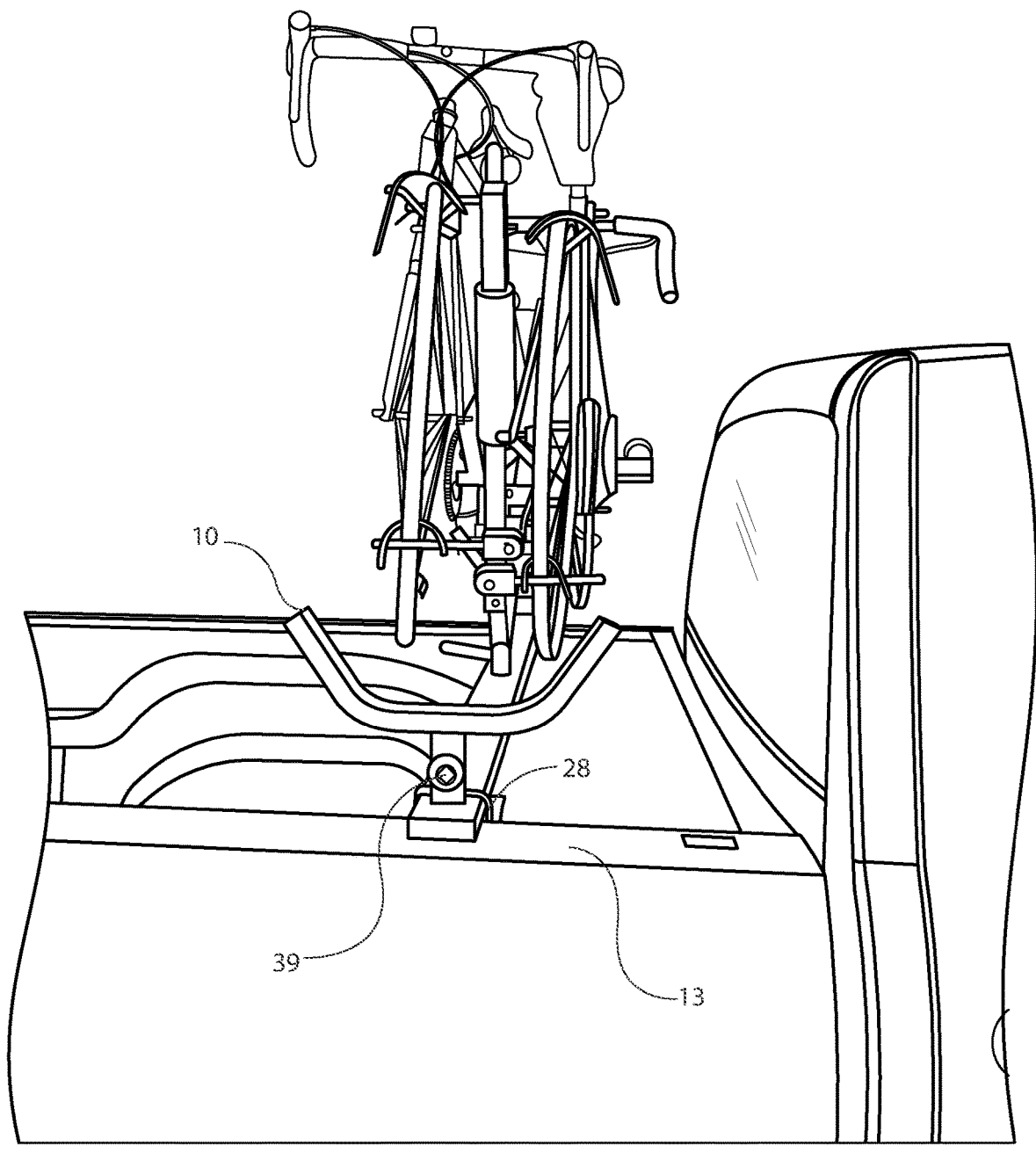
FIG. 3 is a perspective view of the cross-mount system of FIG. 1 with the system mounted near a truck cab with the V mount aligned across the truck bed and having a bicycle attached.
Figure 4:
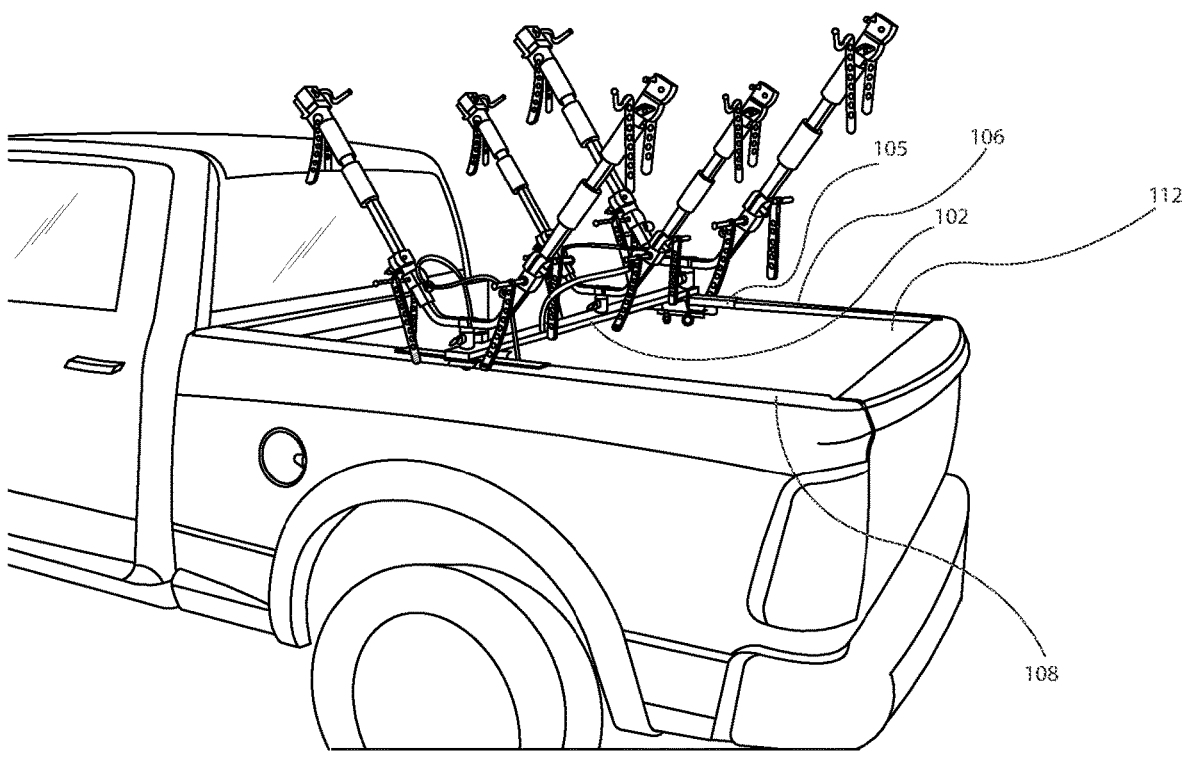
FIG. 4 is another view of the cross-mount system of FIG. 1 having the V mount cargo carriers positioned length wise with the truck bed.
Figure 5:
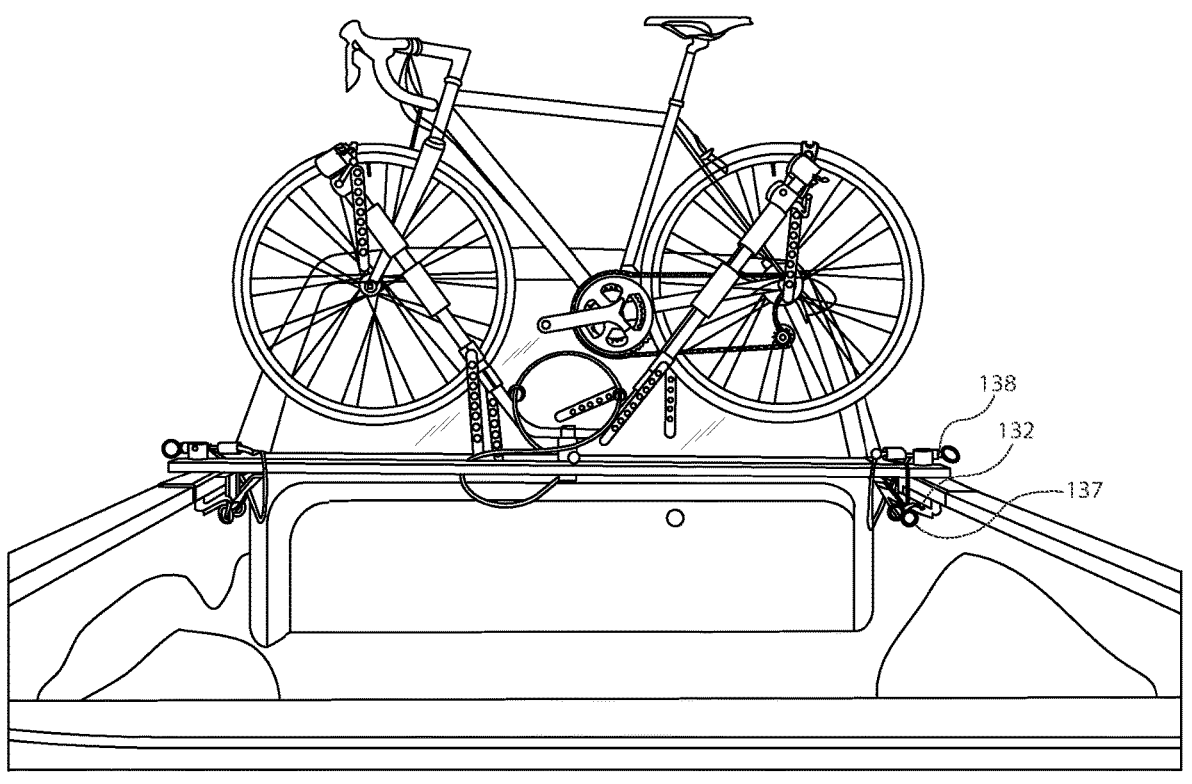
FIG. 5 is another perspective of the cross-mount system positioned near the truck cab with a bicycle and ring locker system in place.
Figure 6:
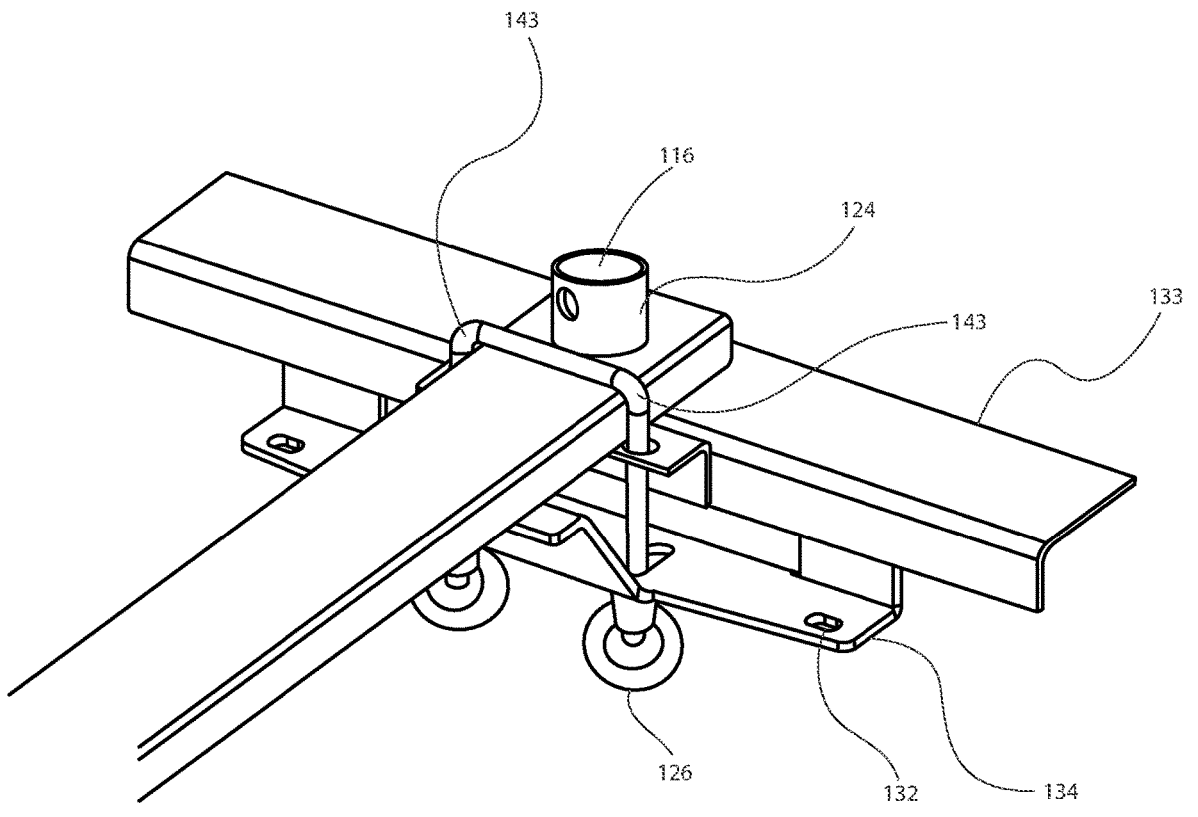
FIG. 6 is a perspective view of the side rail connecting apparatus for the cross-mount system of the present invention.

In this version, the first member 102 spans across the truck bed 112 and is secured to the first rail 106, above the side wall of the bed using the first securement apparatus 105. This is shown in FIGS. 3, 4 and 5. Ideally, this is an adjustable double acting clamp system that utilizes a combined over and under clamping force, as shown in FIG. 6. The connection media include a loop or ring 126 for hand attachment and removal and this ring is one of the components in the locking system that prevents theft of the carrier. The embodiment as shown in FIG. 6 is secured to the truck bed using a U-Bolt 143, top angle plate 133, bottom clamping plate 134 and ring nuts 126 that permit a tool-less installation anywhere along the top surface of the truck bed. The cargo carrier of this embodiment again carries its load above the side sill of the truck bed 112 and the seemingly small movements of the truck bed are amplified by the weight and height of the load carried by the cargo carrier 101. This dynamic motion necessitates securing the cargo carrier 101 to the truck bed rails 106, 108 so that the inertia from the elevated weight of the loaded carrier in both the longitudinal and lateral planes is minimized or eliminated. The L-shaped angle plate 133 of the embodiment transfers these latent motions over a larger footprint and directly to the truck bed where they are absorbed by the structure of the truck bed. The lower angle plate 134 and top L-shaped angle plate 133 of this embodiment contain holes or slots 132 through which the U-Bolt 143 passes to be secured by the RingNuts 126. The lower angle plate 134 functions as a bridge between the second member and the inside surface of the truck bed sill. The lower angle plate 134 design transfers the compression load of the U-Bolt 126 to the second member which is pulled down on top of the top angle and truck bed sill. The lower angle plate 134 vertical ends 144 contact the underside of the truck sill at the outside edges of the lower angle plate 134. This allows this embodiment to be attached in the center of the truck bed, while avoiding the typical sheet metal kiss off's that are also located in the center section of the truck bed. The lower angle plate 134 in this embodiment contains slots 132 into which the locking system passes the RingLocker loop end 138 through, but stops the RingLocker ball end 137 to induce the self-contained mounting system and related cargo under locked condition.

Figure 9:
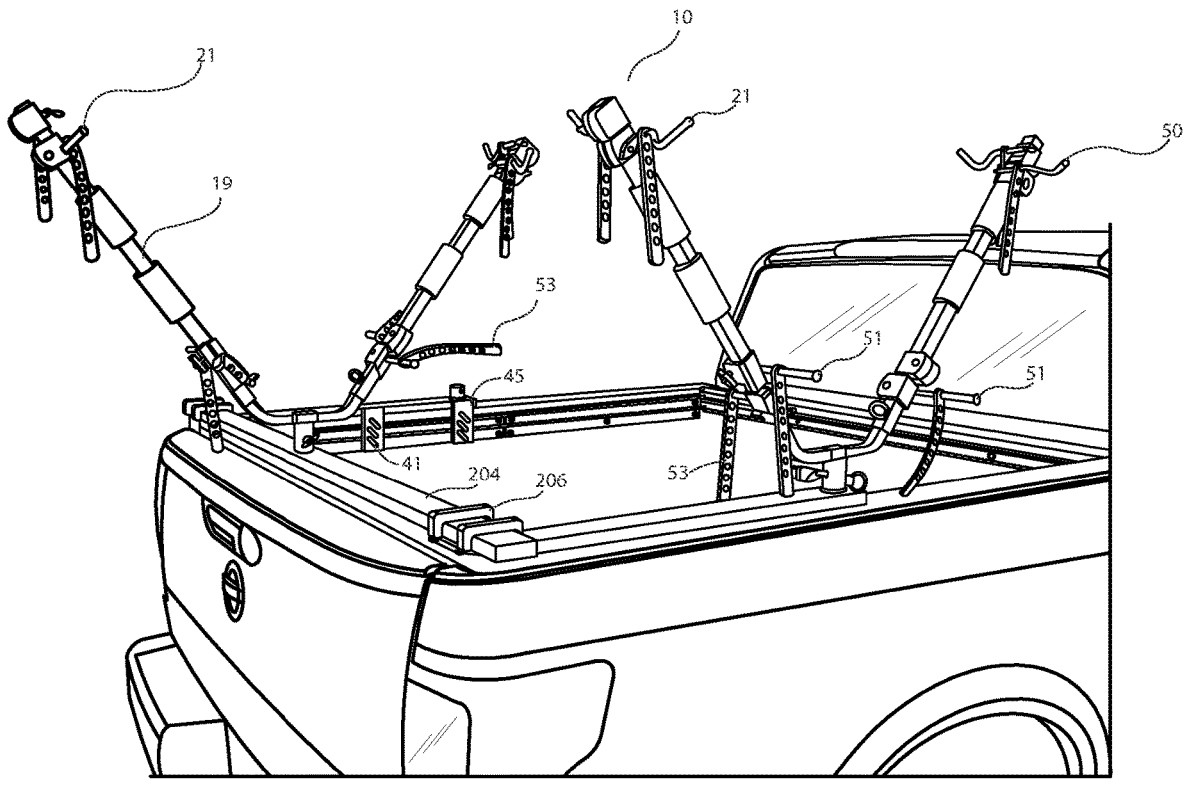
FIG. 9 is a different perspective view of the ¾ mount system of FIG. 7 with the system aligned along the back of the truck bed, along the tail-gate.

The cargo carrier 110 of this embodiment uses the receiver system 109 that has the receiver 124 having the receiver opening 116 that accepts the insertable member 117, that can be threaded and that is located at the bottom of the cargo carrier 110. Preferably this cargo carrier 110 is a V shaped carrier as shown in FIGS. 1-5. The receiver opening 116 is preferably a round hollow tube that is welded to the first member 102 and cross drilled at 90 degrees. The insertable member 117 is sized to matingly fit inside the receiver opening 116 and has a stop ring 63 and bushing 58 to positively locate the insertable member in the receiver opening without guess work. Because of this configuration the insertable member 117 and the attached cargo carrier 110 can be inserted and removed from the receiver opening 116 so that the carrier can be portable and rotatable. The rotating carrier allows access to both the bed side and ground side of the carrier thus making loading and unloading of cargo an easy process while standing on the ground or in the truck bed 112. The receiver opening 116 has a threaded attachment element 22 into which a common and lockable threaded pin 23 is used to both secure and lock the cargo mount to the cargo carrier and by using the threaded engagement it removes all motion from the connection. This is clearly shown in FIG. 19 and the same system is useable with this cross-mount system. The lockable pin could have either the hoop end or it could contain a novel handle 39, as shown in FIG. 19 for amplifying hand strength sufficiently to eliminate motion from this connection, and the pin also accepts the ring end 38 of the locking cable 59 and lock 138 to secure the invention and its cargo to the truck bed. This embodiment can be adjusted front to rear on the truck bed 112 and the receiver 124, that attaches to the member 102, can be used in either an inline or across orientation. This adjustability allows the carrier mount to be located close to the truck cab, as shown in FIGS. 3 and 5, with the cargo carried across the bed, or in the middle of the truck bed with the cargo carried in-line, as shown in FIG. 4, or rearward on the truck bed to not interfered with cross bed tool boxes or other installed equipment, as shown in FIG. 9.

The cargo carrier 110 of this embodiment typically uses the V shaped design described above with upwardly angled wings into which a variety of cargo connectors 121, such as hooks, mounts and retainers can be attached in order to carry a wide variety of objects such as bicycles, ski's, water and snow boards, ladders, racks, string trimmers, fishing rods, lumber, tubing, soft enclosures, hard enclosures, kayaks and any object capable of being lifted onto the carrier and secured by the attachment media. The receiver system 109 can also have the unique ability to rotate 360 degree's in one embodiment and tilted 90 degrees in another embodiment. These spinning and tilting functions provide a wide range of functional advantages related to convenience, access, compactness and functional uses.

The cargo management system 101 of this embodiment secures to the truck bed and truck rails 106, 108 using a variety of attachment media, depending upon the type of truck and bed configuration. These media both clamp the cargo management system 101 to the truck bed side walls and concurrently compress the cargo carrier to the truck bed. The securing media are metallic based and use common threaded fasteners that provide ample torque and force loads to prevent any motion of the cargo carrier on top of the truck bed. The attachment member and related u-bolt 143, upper 133 and lower 134 angle plates allow this embodiment to fit all truck bed side sill profiles and the various truck bed widths.

The cargo carrier 101 attachment media of this embodiment uses the unique receiver and matching cargo carrier and these system provides the ability to move and attach the carrier 101 for modular use. This modularity is again a key value of the invention by way of allowing the carrier 101 to be moved from vehicle to vehicle, from truck bed to roof top, from roof top to receiver hitch and from receiver hitch to an off vehicle stand as example of this modularity.

This system could also be used with a tonneau cover. Again, the cover would have to be drilled in order to secure the system. But as with the L-Shaped system, it is also possible to simply extend the receiver 124 so that it protrudes up and through the tonneau cover. In this configuration the tonneau cover would again be locked in place by the cargo carrier 101 until the cargo carrier is removed, thus allowing the tonneau cover to easily open.

Figure 7:
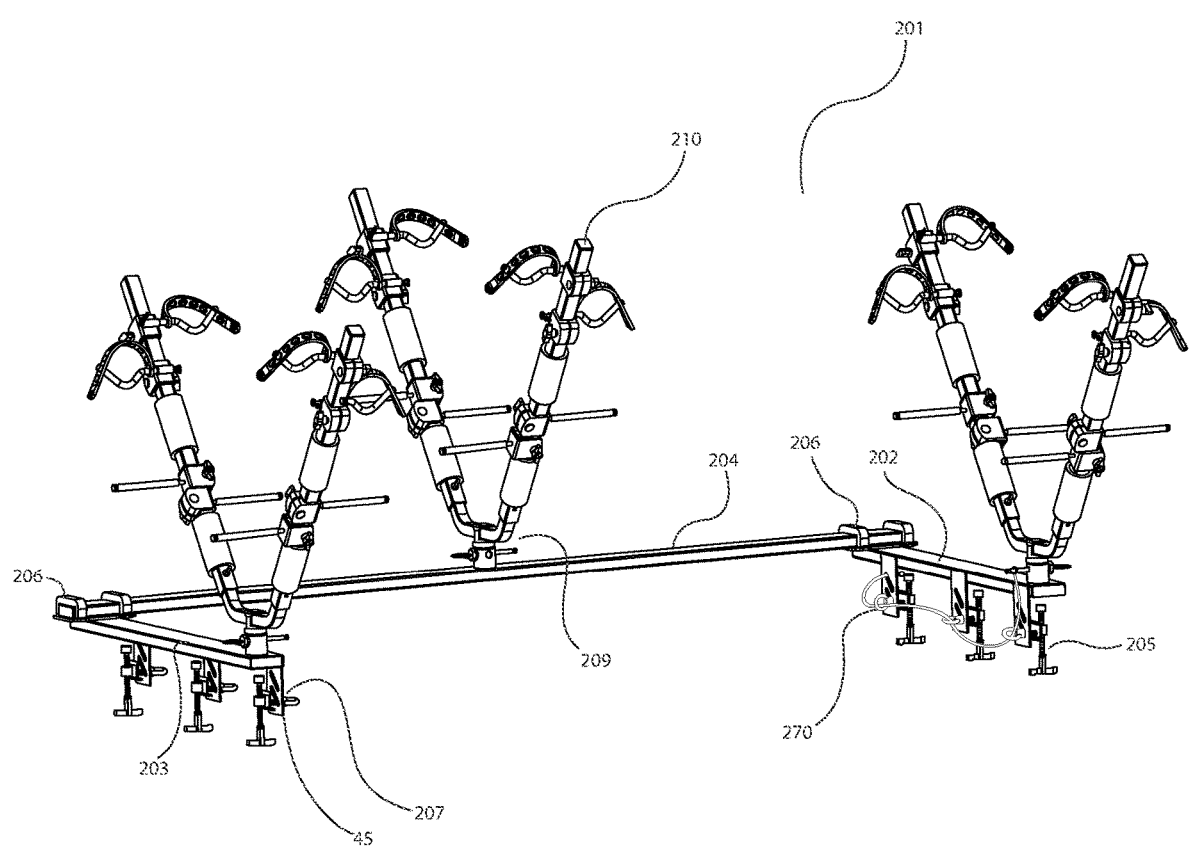
FIG. 7 is a perspective view of the ¾ mount of the present invention, showing the V rack cargo mounting system, ring locker system and the zero G system.
Figure 8:
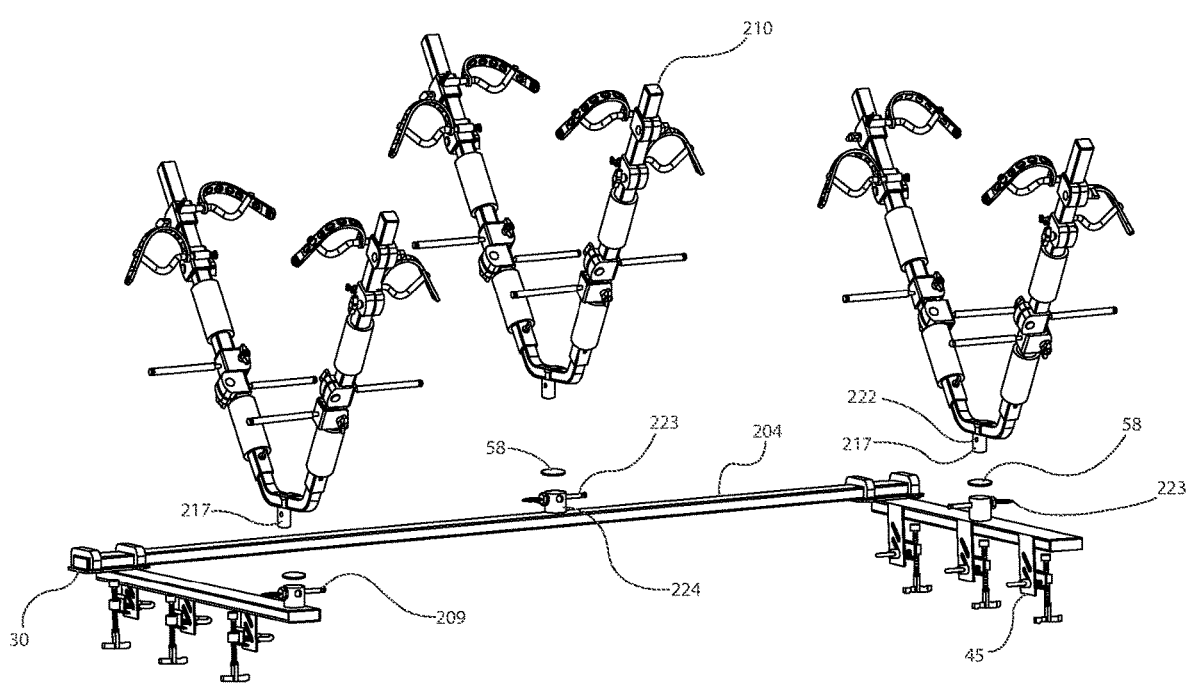
FIG. 8 is an exploded perspective view of the ¾ mount system of FIG. 7.

¾ or Box Mount. FIGS. 7-9 and 22 show a final embodiment of the present invention that is an entirely unique system that utilizes three or four sides of a truck or trailer bed. In this cargo management system 201, as shown in FIG. 7, a first member 202 is secured to a side wall top rail of a bed by a first securement apparatus 205, that is ideally a double clamping sill tube 45 and/or channel hardware 27 and 43 that allows adjustment to fit all truck bed widths and also allows forward or rearward alignment in the truck bed. The system then has a second member 203 that is secured to a second side wall of the bed by a second securement apparatus 207 that is the same as or similar to that apparatus used to secure the first member 202 to the rail of the second wall. A third member 204 is then secured to an end of the first member 202 and an end of the second member 203 by securement apparatus 206, as shown in FIG. 7. The connection media include a loop or ring 126 for hand attachment and removal and this ring 126 is one of the components in the locking system that prevents theft of the carrier, as shown in FIGS. 8, 9 and more clearly in FIG. 15. The second member 203 is used to secure the stop plate 55 and includes the ring lock 27 for hand install and theft prevention. This embodiment of the invention is secured to the side wall of the bed with the adjustable double acting clamp system 45 that utilizes the combined vertical 56 and horizontal clamp force 26. The embodiment attachment system also includes an attachment media for channel-based truck beds that substitute nuts 43 to fit in the channel 42 for the double acting clamp brackets 45 used with truck bed lacking the channel 42.

As shown in FIG. 8, the cargo carrier system of the preferred embodiment uses a similar receiver system described above that features a receiver 224 that accepts a cargo carrier, ideally a V-shaped cargo carrier 210. The receiver 224 is preferably a round hollow tube that is welded to the cargo carrier cross third member 204 and can also be mounted to first member 202 and second member 203. As described above, this receiver can also be mounted on a moveable part that can be positioned in different locations on the cargo carrier members. So, for example, member 204 as shown in FIG. 8, could have one or multiple cargo carriers 210 slid onto member 204. The cargo carrier 201 has a bottom that has an insertable member 217 that is sized to fit inside the receiver 224. As described above, this insertable member makes the carrier 210 rotatable and portable. The rotating carrier 210 allows access to both the bed side and ground side of the carrier thus making loading and unloading of cargo an easy process while standing on the ground. The receiver 224 has a threaded attachment element 222 into which a common and lockable threaded pin 223 is used to both secure and lock the cargo mount to the cargo carrier and by using the threaded engagement it removes all motion from the connection. The receiver 224 also has a stop ring 258 and bushing 259 to positively align the cargo carrier pin hole with the receiver tube pin hole for ease of use. As shown in FIG. 19, the interior threaded element 222 can be either welded in place or insertable and moveable by hand. The insertable element can be a square or rectangular nut that is secured in place with a compression spring that holds the threaded element in place and aligned properly for receiving the threaded pin. This insertable member, when in the shape of a square nut or some variation thereof, does not move or rotate in the tube due to the fact that the cylindrical tube walls prevent nut rotation. So, in a preferred embodiment, the member is a rectangle nut that then is inserted into the cylindrical tubing, and the cylindrical tubing prevents motion and rotation and eases threaded pin insertion and tightening.

As above, in the preferred embodiment the cargo carrier uses a V shaped design with upwardly angled wings into which a variety of hooks, mounts and retainers can be attached in order to carry a wide variety of objects such as bicycles, ski's, water and snow boards, ladders, racks, string trimmers, fishing rods, lumber, tubing, kayaks and any object capable of being lifted onto the carrier and secured by the attachment media. The cargo carrier here again has the unique ability to be rotated 360 degree's in one embodiment and tilted 90 degrees in another embodiment. This spinning and tilting function provide a wide range of functional advantages related to convenience, access, compactness and functional uses.

An interesting and novel use is shown in FIG. 22. In this embodiment the cargo carrier system uses a four-rail system that is cantilevered off the rear of the truck. This creates an elongated carrying space that extends beyond the end of the truck bed, thus providing the ability to securely and safely carry a kayak, as shown in FIG. 22. Alternatively, bicycles or other cargo could be carried from the racks.

The cargo management system of the preferred embodiment secures to the truck bed using multiple attachment media, as shown in FIGS. 7, 8 and 9. These media both clamp the first and second members to the truck bed and concurrently compress the members to the truck bed. The securing media are metallic based and use common threaded fasteners that provide ample torque and force loads to prevent any motion of the cargo management system on top of the truck bed. In one embodiment, shown in FIGS. 14 and 15, an attachment media plate is welded to the member and features one or more, and preferably three diagonal slots 41 into which the securing media can be adjusted to fit all truck bed side sill profiles. The securing media feature a round ring or loop 27 to permit hand tightening of the media onto the truck bed to adequately torque load the cargo carrier to the truck bed for motion restraint. The diagonal slots 41 are oriented so that if the securing media loosens, any upward motion results in an equal and corresponding forward motion that is used to wedge the carrier tighter into the corner of the truck.

The receiver system 209 features a common way to move and attach the cargo carriers 210 for modular use. This modularity is a key value of the invention by way of allowing the carrier 210 to be moved from vehicle to vehicle, from truck bed to roof top, from roof top to receiver hitch and from receiver hitch to an off vehicle stand as example of this modularity.

Figure 21:
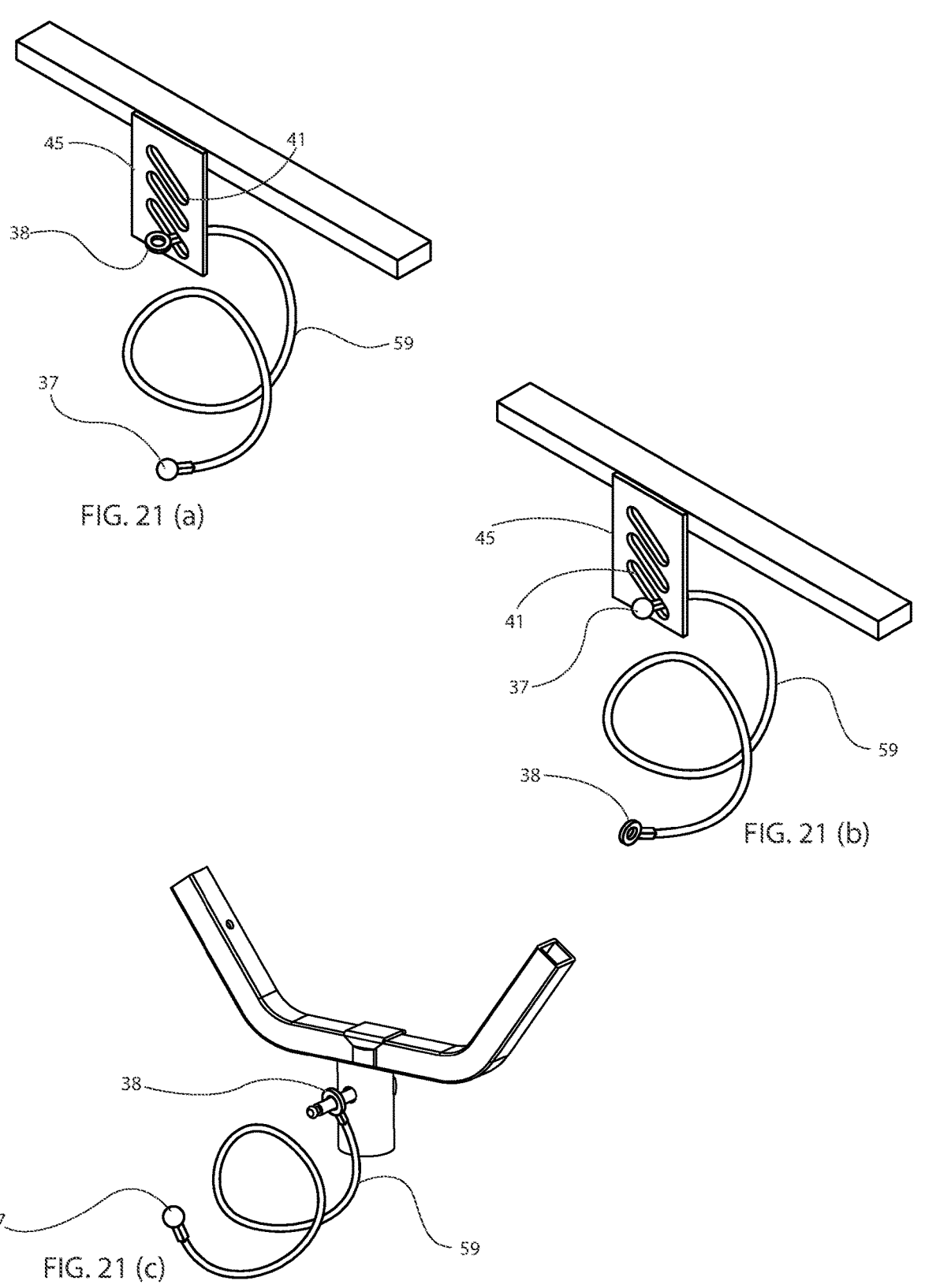

RingLocker. FIGS. 12, 19 and 21 shows the parts of the RingLocker system. As briefly described above the present invention utilizes a security system 17, FIG. 19, that both prevents theft of the cargo carrier and the cargo being transported. This is accomplished by the use of RingPins 27, as shown in FIGS. 13 and 14, RingNuts 26 as shown in FIGS. 7, 10, 11, 12, 15 and 20, and a braided cable with unique end fittings 59, as shown clearly in FIGS. 11, 17, and 21A, 21B and 21C. The RingPins 27 and RingNuts 26 are typical fasteners that have the added feature of a round ring fabricated to them. These rings provide a secure pathway for a wire rope cable 59 to be routed through and locked to a SpinPin 39 (FIG. 19) used to attach the cargo carrier to the receiver. This wire rope 59 can also be routed through a bicycle frame so that the cargo carrier, the carrier members, the carrier RingNut 26 and the bicycle is locked to the truck bed by one lock system, as shown in FIGS. 11, 12 and 13. The wire rope cable 59 has end tips that fit through the RingPins 27 and RingNuts 26 and finally onto the locking SpinPin 23 so that the cable twists itself tight before the RingPin or RingNut unthread themselves.

The rings are attached to threaded posts and nuts, as shown in FIG. 21C, and these posts and nuts are used to secure the cargo management system to the top rail. The cable has a solid end 37 and a loop end 38. The solid end 37 is jammed tight to the cargo management rail mounting structure. To utilize this system the flexible cable 59 is threaded through the rings such that the loop end 38 passes through the rings and the cargo (such as bicycle wheels or frame). It is then locked by a base member securing pin. This simple system removes the need for complicated locking mechanisms that would typically include heavy locks, multiple locks and complicated means to secure the apparatus. With this system it is possible to use one cable and one lock to secure both the cargo management system to the vehicle and to secure the cargo to the cargo management system.

Accessible Cargo mount (spinner). The cargo carrier of the preferred embodiment can hold cargo on both the outside and inside of its V shaped Wing. In order to facilitate loading and unloading from the ground, the cargo carrier has a spin feature incorporated to the receiver and the cargo carrier. The cargo carrier is removable and lockable by way of a single threaded pin, or SpinPin 39 as described above and shown in FIG. 19, that also removes all motion and vibration when tightened. The tightening function is a no-tool feature using the RingPin 27 where the RingPin 27 also facilitates locking the cargo carrier to the truck bed and locking the carried contents, like bicycles, to the cargo carrier. The receiver can be fixed at each 90-degree position. The tightening function is aided by the mating of the round female and male tubes where the convex surfaces nest each other to restrain motion. The threaded element in the cargo carrier can be either fixed by welding or removable by way of a compression spring or elastomeric media, as described above.

Double acting bed clamps secure the invention to the truck bed without modifying the truck bed or drilling holes. The clamping technique functions by compressing the carrier bracket to the side flange of the truck bed and at the same time compressing the carrier sill tube against the top of the truck bed. The fasteners utilized are part of the invention's RingLocker system for locking the rack onto the truck bed without modification or tools.

In FIG. 12 upper left bubble, the wedging bed clamp 5 uses a threaded post 126 mounted to an adjustable metal stamping 66 to contact both the inside of the pickup bed return flange 13 and the inside of the carriers mounting bracket 5. The threaded post 126 protrudes though either of three diagonal mounting slots 41 in the carrier bracket 5. These diagonal slots 41 allows for a 'one size fits all' with the various truck bed profiles in the market to positively secure member 1 from motion and two force the carrier forward and jammed into the truck bed corner in the event of loosening whereby as the carrier attempts to lift it is equally pressed into the truck corner by the diagonal slots.

The locking system is incorporated into the carrier's attachment to the truck bed, as shown in FIG. 21. The basic function of the locking system uses a vinyl coated wire cable 59 and RingPins 27 attached to the carrier mounting bolts and pins. One end 38 of the cable is passed through the diagonal slots 41 on the clamping bracket 45 and is stopped from passing completely though by a boss or button 37 on the opposite end. The other end of the cable containing a loop end fitting 38 is threaded though the RingPins 27 attached to the bolts and pins of the carrier and finally onto the locking SpinPin 39 that anchors the cargo carrier 10 in the sill tube pocket receiver 24. The cable 59 prevents theft by preventing the RingPins 27 and RingNuts 26 from turning. If the carrier is used for bicycles, the cable can also be used to lock the bicycles onto the racks and used to lock the cargo carrier 10 into the receiver 24, as shown in FIGS. 10 and 19.

While the present invention has been shown and described by reference to a several illustrated embodiments and by reference to a number of changes which can be made thereto, the present invention is not to be limited thereby but is to be limited solely by the scope of the claims that follow.

The invention claimed is:

1. A cargo management system comprising:
a first member securable to a first rail;
a second member securable to a second rail;
said first member and said second member meet in a corner to form an L and are fixedly secured one to the other;
at least one first adjustable clamping securement apparatus that externally engages said first member and said first rail at least at a proximal end opposite said corner, to secure said first member to said first rail, wherein said at least one first adjustable clamping securement apparatus compresses a portion of said first member to said first rail and compresses said first member against a top of said first rail simultaneously;
at least one second adjustable clamping securement apparatus that externally engages said second member and said second rail along said second member to secure said second member to said second rail, wherein said at least one second adjustable clamping securement apparatus compresses a portion of said second member to said second rail and compresses said second member against a top of said second rail simultaneously;
at least one cylindrical receiver permanently affixed on a top of said first member; and
at least one cargo carrier having a cylindrical mounting post, insertable into and securable to said at least one cylindrical receiver.

2. The cargo management system of claim 1 where
the at least one cylindrical receiver has linearly aligned holes on opposite sides of the at least one cylindrical receiver;
the cylindrical mounting post has linearly aligned holes on opposite sides of the cylindrical mounting post; and
a locking pin, insertable through and removeable from all the holes.

3. The cargo management system of claim 2 where said cargo carrier is a rack having at least two arms that form a V.

4. The cargo management system of claim 3 where said V has at least one cargo connector.

5. The cargo management system of claim 4 where said arms are length adjustable.

6. The cargo management system of claim 5 where an angle between said arms is adjustable.

7. The cargo management system of claim 1 where said cargo carrier is removeable and portable from one location to another.

8. The cargo management system of claim 1 where said cargo connector is moveable along said first or said second members.

9. A cargo management system comprising:
an L shaped apparatus having a first member securable to a first rail and a second member securable to a second rail that are directly connected one to the other;
at least one first externally connectable adjustable clamping securement apparatus located at least at a proximal end opposite said corner, to secure said first member to said first rail, wherein said at least one first externally connectable adjustable clamping securement apparatus compresses a portion of said first member to said first rail and compresses said first member against a top of said first rail simultaneously;
at least one second externally connectable adjustable clamping securement apparatus located along said second member to secure said second member to said second rail, wherein said at least one second externally connectable adjustable clamping securement apparatus compresses a portion of said second member to said second rail and compresses said second member against a top of said second rail simultaneously; and
at least one cylindrical receiver permanently affixed on a top of either of said first member or said second member, to receive a cylindrical mounting post.

10. The cargo management system of claim 9 where said cylindrical receiver can receive and secure a variety of different cargo carriers having a cylindrical mounting post, insertable into and securable to said cylindrical receiver;

the cylindrical receiver has linearly aligned holes on opposite sides of the at least one cylindrical receiver;

the cylindrical mounting post has linearly aligned holes on opposite sides of the cylindrical mounting post; and a locking pin, insertable through and removeable from all the holes.

11. The cargo management system of claim 10 where cylindrical receiver is moveable and securable along either of said first or said second members.

12. The cargo management system of claim 10 where said cargo carrier is a V shaped member.

13. The cargo management system of claim 12 where said V shaped member has a first arm and a second arm and at least one cargo connector that is moveable up and down along a length of either of said first arm or said second arm.

14. The cargo management system of claim 13 where said cargo connectors are designed to hang a bicycle by its wheels.

15. The cargo management system of claim 13 having:

two receivers;

two V shaped cargo carriers;

having cargo connectors; where said cargo connectors are designed to secure a long cargo.

16. A cargo management system for securement to box top rails at and extending from a corner comprising:

an L shaped apparatus having a first member and a second member, directly connected one to the other, that are matingly fit into said corner of said box top rails;

at least one first externally connectable adjustable clamping securement apparatus to secure said first member to a first box top rail where said at least one first externally connectable adjustable clamping securement apparatus is located at least at a proximal end opposite said corner, wherein said at least one first externally connectable adjustable clamping securement apparatus compresses a portion of said first member to said box top rails and compresses said first member against a top of said box top rails simultaneously;

at least one second externally connectable adjustable clamping securement apparatus to secure said second member to a second box top rail where said at least one second externally connectable adjustable clamping securement apparatus is located along said second member, wherein said at least one second externally connectable adjustable clamping securement apparatus compresses a portion of said second member to said box top rails and compresses said second member against a top of said box top rails simultaneously;

at least one cylindrical receiver permanently affixed on a top of either of said first member or said second member;

where said at least one cylindrical receiver is designed to receive and securely affix a cargo carrier having a cylindrical mounting post that is insertable into said at least one cylindrical receiver.

17. The cylindrical receiver system of claim 16 where said cylindrical receiver system comprises:

a cylindrical receiver opening;

linearly aligned holes on opposite sides of the cylindrical receiver;

an insertable cylindrical member formed at a bottom of said cargo carrier;

linearly aligned holes on opposite sides of said insertable cylindrical member;

said insertable cylindrical member is matingly insertable into said cylindrical receiver opening; where insertable cylindrical member can be securely affixed within said cylindrical receiver opening in different positions; and a locking pin is insertable through and removeable from all the holes.

18. The receiver system of claim 17 where said insertable member can be pivoted from zero to ninety degrees.

19. The cargo management system of claim 18 where said cargo carrier is a V shaped apparatus having a first arm and a second arm and where said cargo carrier is moveable along the length of either of said first or second members of said L shaped apparatus.

20. The cargo management system of claim 17 configured to be used with a tonneau cover.

\* \* \* \* \*